[19] United States Patent
Hamada et al.

[11] Patent Number: 5,402,400
[45] Date of Patent: Mar. 28, 1995

[54] METHOD AND APPARATUS FOR ELIMINATING EXTERNAL DISTURBANCES IN A DISK DRIVE DEVICE

[75] Inventors: Yosuke Hamada, Ibaraki; Haruaki Otsuki, Toride; Yuji Hata, Odawara; Shigeyoshi Saito, Odawara, all of Japan

[73] Assignee: Hitachi, Ltd., Tokyo, Japan

[21] Appl. No.: 109,593

[22] Filed: Aug. 20, 1993

[30] Foreign Application Priority Data

Sep. 4, 1992 [JP] Japan .................................. 4-237005
Mar. 16, 1993 [JP] Japan .................................. 5-055767

[51] Int. Cl.⁶ .............................................. G11B 17/22
[52] U.S. Cl. ...................................... 369/32; 360/77.04; 360/78.07; 360/75
[58] Field of Search ............. 369/32, 30, 44.78, 44.27, 369/44.32; 360/75, 77.01, 77.02, 77.04, 78.04, 78.06, 78.07

[56] References Cited

U.S. PATENT DOCUMENTS

| | | | |
|---|---|---|---|
| 4,775,903 | 10/1988 | Knowles | 360/77.04 |
| 4,982,297 | 1/1991 | Tsujisawa | 360/77.04 |
| 5,187,620 | 2/1993 | Notake et al. | 360/77.04 |
| 5,229,896 | 7/1993 | Tohyama et al. | 360/78.07 |
| 5,233,586 | 8/1993 | Morisada | 360/77.04 |
| 5,283,702 | 2/1994 | Tsuyuguchi et al. | 360/77.04 |

FOREIGN PATENT DOCUMENTS 1-43378 8/1984 Japan.

OTHER PUBLICATIONS

Mee, C. Dennis and Eric D. Daniel, eds., *Magnetic Recording*, pp. 53–84, McGraw–Hill, 1988.

*Primary Examiner*—Robert J. Pascal
*Assistant Examiner*—Tan Dinh
*Attorney, Agent, or Firm*—Antonelli, Terry, Stout & Kraus

[57] ABSTRACT

A disk storage device comprises a microcomputer for estimating an external disturbance compensation signal and storing it and a first adder for adding the external disturbance compensation signal as a feedforward signal to a positioning compensation signal to a drive circuit. Where a positioning compensator for estimating a velocity signal based on a drive signal is provided, a difference signal between the drive signal and a signal proportional to the external disturbance compensation signal, instead of the drive signal, is applied to velocity estimation unit for correction.

23 Claims, 16 Drawing Sheets

MAIN POSITION ERROR SIGNAL

TIME

MAIN POSITION ERROR SIGNAL

TIME

MAIN POSITION ERROR SIGNAL

TIME

MAIN POSITION ERROR SIGNAL

TIME

METHOD AND APPARATUS FOR ELIMINATING EXTERNAL DISTURBANCES IN A DISK DRIVE DEVICE

BACKGROUND OF THE INVENTION

1. Field of the Invention

The present invention relates to a disk storage device such as a magnetic disk device or an optical disk device, and more particularly to means for calculating a compensation signal for cancelling an external disturbance which acts on a head positioning control system, storing it, and supplying it to a drive circuit as a part of input signals to suppress the external disturbance, improve a head positioning precision and shorten a head positioning time.

2. Related Background Art

In many of the prior art magnetic disk devices, a system for floating a magnetic head as a rotation speed of the disk increases has been adopted, and it is necessary to position the head externally of a data area when the device is started and stopped in order to protect the data storage area. Usually, an actuator is pushed in one direction by a spring called a retract spring or the head is retracted externally of the data area by the weight of the actuator. The spring force and the weight of the actuator are causes of the external disturbance and the effect on the head positioning control system is significant and it causes a variation in the transitional response by an error in a steady state position or a difference in a direction of movement.

The disk storage device, is vibrated according to a rotating frequency since the disk is rotated at a high rotation speed, and this vibration acts on the position signal as the external disturbance and deteriorates the positioning precision.

Where a velocity control system is used as a control system for moving the head to a target track and a velocity detector estimates a velocity signal based on the position signal and a drive signal, the external disturbance of the disk vibration causes a detection error and a variation in the response of the velocity control system.

Further, in the prior art optical disk device, in order to position the head, a coarse actuator for driving a large distance and a fine actuator for finely positioning after the drive by the coarse actuator are provided, and the head is mounted on the fine actuator. For the fine positioning, it is necessary that the fine actuator be activated, but when the eccentricity of the disk is large compared to a stroke of the fine actuator, the positioning by the fine actuator is not attained and the positioning precision is lowered.

As an external disturbance compensation method, JP-A-1-43378 proposes a compensation method in which an error signal of an estimated velocity signal and a velocity signal is fed back to be added to an input of a power amplifier as an external disturbance cancellation signal.

As the speed and the capacity of the disk storage device increase, spacing between tracks has been reduced more and more and the weight of an actuator has been greatly reduced. As a result, the affect of the external disturbance is more and more discernable. In the disk storage device, when a center of rotation of the disk does not coincide with a center of gravity, the disk is vibrated at the rotating frequency. Accordingly, it is important to suppress the external disturbance. There is a limit from a resonance characteristic of a head support mechanism in suppressing the external disturbance.

In the prior art method for estimating and suppressing the external disturbance it disclosed in JP-A-1-43378, the error between the detected velocity signal and the estimated velocity signal is amplified and fed back. It can suppress a low frequency external disturbance but when a high frequency mechanical vibration is to be suppressed, a signal derived by differentiating the position signal including a high frequency noise as a velocity signal, a S/N ratio of the velocity signal is lowered and a frequency band of a position differentiation circuit cannot be set high. As a result, the high frequency external disturbance and vibration cannot be suppressed. In a method of feeding back an estimated error, a delay by the feedback compensation is included and good compensation of the external disturbance is not attained.

SUMMARY OF THE INVENTION

It is an object of the present invention to provide a disk storage device which suppresses external disturbance while reducing a delay due to feedback compensation and securing the stability to a position signal including a noise to shorten access time, precisely position a head and reduce a variation of positioning due to the external disturbance.

In order to achieve the above object, the present invention provides a disk storage device having a head positioning servo mechanism comprising at least one disk to be rotatably driven, a head for reading a servo signal recorded on the disk to indicate a radial position and a circumferential position of the disk, a position detector for generating a position signal representing a position of the head from the servo signal, an actuator having the head secured thereto, a drive circuit for producing a drive signal in accordance with an input signal to drive the actuator, a controller for outputting a move command in accordance with an externally applied control signal, a positioning compensator for calculating a positioning compensation signal such that the position signal coincides with a target position in accordance with the move command from the controller and outputting the positioning compensation signal to the drive circuit, estimation means for estimating an external disturbance compensation signal for cancelling as a function of the drive signal and the position signal, memory means for storing the external disturbance compensation signal, and first correction means for adding to an input signal of the drive circuit the external disturbance compensation signal stored in the memory means as a feedforward signal for correction.

More specifically, the estimation means calculates, immediately after the power-on and at every predetermined time interval after the power-on, a synchronous external disturbance compensation signal for suppressing the external disturbance acting in one circumferential direction during a plurality of revolutions of the disk when the head is positioned to one representative or a plurality of representative or all of the tracks of the disk as target disks, determines the synchronous external compensation signal on tracks other than the target tracks by interpolating the data of the synchronous external disturbance compensation signals of the representative tracks, and stores the synchronous external disturbance signal in the memory means as a function of the position on the disk. The first correction means outputs the synchronous external compensation signal in accordance with the position on the disk as the feedforward signal.

The estimation means calculates, immediately after the power-on and at each predetermined interval after the power-on, a DC external disturbance compensation signal for suppressing the DC external disturbance acting on the target tracks during a plurality of revolutions of the disk when the head is positioned to one representative or a plurality of representative or all of the tracks of the disk as target tracks during a plurality of revolutions of the disk, determines the DC external disturbance compensation signals of tracks other than the target tracks by interpolating the data of the DC external disturbance compensation signals of the representative tracks, and stores the DC external disturbance compensation signals in the memory means as a function of the position on the disk. The first correction means may output the DC external disturbance compensation signal in accordance with the position on the disk as the feedforward signal.

Further, the estimation means calculates, immediately after the power-on and at each predetermined interval after the power-on, an AC external disturbance compensation signal for suppressing the AC external disturbance acting on the target tracks during a plurality of revolutions of the disk when the head is positioned to one representative or a plurality of representative or all of the tracks of the disk as the representative tracks, determines the AC external disturbance compensation signals on tracks other than the target tracks by interpolating the data of the AC external disturbance compensation signal of the representative tracks, and stores the AC external disturbance compensation signals in the memory means as a function of the position on the disk. The first correction means may output the AC external disturbance compensation signal in accordance with the position on the disk as the feedforward signal.

Further, the estimation means calculates, immediately after the power-on and at each predetermined period after the power-on, the AC external disturbance compensation signal for suppressing the AC external disturbance acting on the target tracks during a plurality of revolutions of the disk when the head is positioned to one representative or a plurality of representative or all of the tracks of the disk as the target disks, determines the AC external disturbance compensation signal on tracks other than the target tracks by interpolating the data of the AC external disturbance compensation signal of the representative tracks, and stores the AC external disturbance compensation signal in the memory means as the function of the position on the disk. Then, the head is positioned to one new representative or a plurality of new representative or all of the tracks, and the estimation means calculates the DC external disturbance compensation means for suppressing the DC external disturbance acting on the new tracks during a plurality of revolutions of the disk, determines the DC external disturbance compensation signal on the tracks other than the new target tracks by interpolating the DC external disturbance compensation signal of the new representative tracks, and stores the DC external disturbance compensation signal in the memory means as the function of the position on the disk. The first correction means may output a sum signal of the AC external disturbance compensation signal and the DC external disturbance compensation signal in accordance with the position on the disk as the feedforward signal.

In any case, second correction means may be provided between the output of the drive circuit and the output of the estimation circuit, and the input of the positioning compensator, and the positioning compensator may include velocity signal estimation means for estimating a velocity signal of the head as a function of the drive signal and the position signal, and the second correction means may determine a signal equal to a difference between the drive signal and a signal proportional to the external disturbance compensation signal, and output the difference signal to the velocity signal estimation means instead of the drive signal.

In the present invention, the estimation means for estimating the external disturbance compensation signal for cancelling the external disturbance of the disk storage device, the means for estimating the head position signal and the velocity signal, and the means for amplifying the error between the position signal and the estimated signal are provided.

When the external disturbance does not act an the positioning control system, the position signal and the estimated position signal are equal. However, when the external disturbance acts on the positioning control system, there is an error between the position signal and the estimated position signal. Since this error is due to the action of the external disturbance, a signal necessary to cancel the external disturbance may be generated by an external disturbance compensation value derived by amplifying the estimated position error signal which is the difference between the position signal and the estimated position signal. The estimation means adds the external disturbance compensation values calculated during the plurality of revolutions of the disk for each circumferential position, averages them, and calculates the synchronous external disturbance compensation signal for suppressing the external disturbance acting to the same circumferential position based on the calculated external disturbance compensation value and the average of movement of the external disturbance compensation values calculated at times before and after thereof. The calculated synchronous external disturbance compensation signal has a reduced non-reproducible noise included in the position signal.

The estimation means may further calculate the DC external disturbance compensation signal which is a mean value of the external disturbance compensation values and calculate the AC external disturbance compensation signal which is the difference between the synchronous external disturbance compensation signal and the DC external disturbance compensation signal. The memory means stores the external disturbance compensation signal produced by the estimation means as the function of the position on the disk.

The above operation is conducted for the representative tracks on the disk, the external disturbance compensation signals of the tracks which are not stored are interpolated from the external disturbance compensation signals of the representative tracks stored in the memory means to determine the external disturbance compensation signals for all tracks and they are stored in the memory means.

The first correction means outputs the external disturbance compensation signal stored in the memory means as the feedforward signal in accordance with the head position on the disk, and adds that signal to the positioning compensation signal of the positioning control system to apply it to the drive circuit as a drive signal to cancel the external disturbance, improve the positioning precision and shorten the access time.

The external disturbance compensation signal estimated by the estimation means immediately after the power-on of the disk storage device and at each predetermined time thereafter in the memory means and the correction is made based on the stored external disturbance compensation signals until the external disturbance compensation signals stored in the memory means are updated. In the present method, even if the operation speed of the estimation means is slow, a stable correction operation is attained and the external disturbance and the vibration are cancelled, the positioning precision is improved and the access time is shortened.

Where the positioning compensator having the velocity estimation means for estimating the velocity signal by combining the differentiated signal of the position signal passed through a low-pass filter and the integrated signal of the drive signal passed through a high-pass filter is adopted, the estimated velocity also includes an error because the position signal include the external disturbance.

On the other hand, in accordance with the first correction means of the present invention, the external disturbance is not included in the position signal applied to the velocity estimation means and the effect due to the external disturbance is eliminated.

In the disk storage device of the present invention, the second correction means applies the signal which is the difference between the drive signal and the external disturbance compensation signal to the velocity estimation means instead of the drive signal. In this correction method, the velocity estimation means is not affected by the external disturbance and a variation of the response of the positioning control system is reduced.

In order to achieve the above object, the present invention provides a disk storage device comprising a head for reading a servo signal recorded on a disk for representing a radial position and a circumferential position of the disk, a position detector for generating a position signal representing the position of the head from the servo signal, a drive circuit for outputting a drive signal for driving an actuator having the head secured thereto in accordance with an input signal, a positioning compensator for calculating a positioning compensation signal to cause the position signal to coincide with a target position and outputting the positioning compensation signal to the drive circuit, first correction means for adding a first external disturbance compensation signal for cancelling periodic external disturbance applied to a positioning control system of the head to an input signal to the drive circuit for correction, memory means for storing the first external disturbance compensation signal and outputting the same in accordance with the position signal, second correction means for adding a second external disturbance compensation signal for cancelling the external disturbance remaining after the cancellation by the first external disturbance compensation signal to the positioning compensation signal for correction, estimation means for estimating the second external disturbance compensation signal as a function of the output of the second correction means and the position signal, and an external disturbance compensation signal modifier for generating a sum signal of the first external disturbance compensation signal and the second external disturbance compensation signal and storing the sum signal in the memory means as a new first external disturbance compensation signal.

Further, in the disk storage device comprising a positioning compensator having velocity signal estimation means for estimating a velocity signal as a function of the drive signal and the position signal, third correction means is provided to subtract a signal proportional to the first external disturbance compensation signal from the drive signal, and the subtracted signal is applied to the velocity estimation means instead of the drive signal to reduce the velocity estimation error by the external disturbance and reduce a variation in the response by the external disturbance.

In accordance with the above construction, the estimation means for estimating the second external disturbance compensation signal for cancelling the external disturbance may comprise a unit for calculating the estimated position signal of a head and the estimated velocity signal and amplifying the error between the position signal and the estimated position signal. When the external disturbance does not act on the positioning control system, the position signal coincides with the estimated position signal. However, when the external disturbance acts on the positioning control system, there is an error between the position signal and the estimated position signal. This error is caused by the action of the external disturbance and the second external disturbance compensation signal derived by amplifying the estimated position error signal which is the difference between the position signal and the estimated position signal and the control system can generate a signal necessary to cancel the external disturbance.

Immediately after the power-on, the first external disturbance compensation signal stored in the memory means is zero and the second external disturbance compensation signal attempts to cancel the external disturbance acting on the head positioning control system. The external disturbance compensation signal modifier stores the sum of the first external disturbance compensation signal and the second external disturbance compensation signal in the memory means in accordance with the position of the head on the disk. As a result, a new first external disturbance compensation signal for reducing the periodic external disturbance is generated in the memory means (first external disturbance compensation table modification).

The generated first external disturbance compensation signal is added to the first correction means to reduce the external disturbance and the second correction means adds the second external disturbance compensation signal so that the reduced periodic external disturbance is further reduced. The external disturbance compensation signal modifier stores the sum of the first external disturbance compensation signal and the second external disturbance compensation signal in the memory means as a new first external disturbance compensation signal (second external disturbance compensation table modification).

The secondly generated external disturbance compensation table has the double external disturbance suppression ability of the first generated external disturbance compensation table. By repeating the above operation, the external disturbance suppression ability can be gradually enhanced.

The above operation is conducted several times for the representative tracks on the disk and the first external disturbance compensation signals for the tracks not stored in the memory means are interpolated from the first external disturbance compensation signals of the predetermined tracks stored in the memory means so that the first external disturbance compensation signals for all tracks are determined and they are stored in the memory means.

Thereafter, the memory means outputs the stored first external disturbance compensation signal in accordance with the head position on the disk and the first correction means adds it to the input signal to the drive circuit to cancel the external disturbance, improve the positioning precision and reduce the access time. Thereafter, the first correction means as well as the second correction means are activated to further improve the positioning precision.

The first external disturbance compensation signal generated by the external disturbance compensation signal modifier immediately after the power-on of the disk storage and at each predetermined time thereafter is stored in the memory means and the correction is made by using the stored external disturbance compensation signal until the external disturbance compensation signal stored in the memory means are updated. Thus, even if the operation speed of the estimation means is low, a stable correction operation is attained. Through the correction, the external disturbance and the vibration are cancelled and the positioning precision is improved and the access time is reduced.

In the positioning compensator having the velocity estimation means for combining the differentiated position signal passed through the low-pass filter and the integrated drive signal passed through the high-pass filter to estimate the velocity signal, the estimated velocity also includes an error because the external disturbance is included in the position signal. In the disk storage device of the present invention, the third correction means is provided to supply the signal which is the difference between the drive signal and the external disturbance compensation signal to the velocity estimation means instead of the drive signal. Through this correction, the effect due to the external disturbance is eliminated and the variation in the response of the positioning control system is reduced.

Other objects, features and advantages of the present invention will be apparent from the preferred embodiments of the present inventions to be described hereinafter.

DETAILED DESCRIPTION OF THE PREFERRED EMBODIMENTS

The embodiments of the disk storage device of the present invention are now described with reference to FIGS. 1 to 10.

<First Embodiment>

Figure 1:
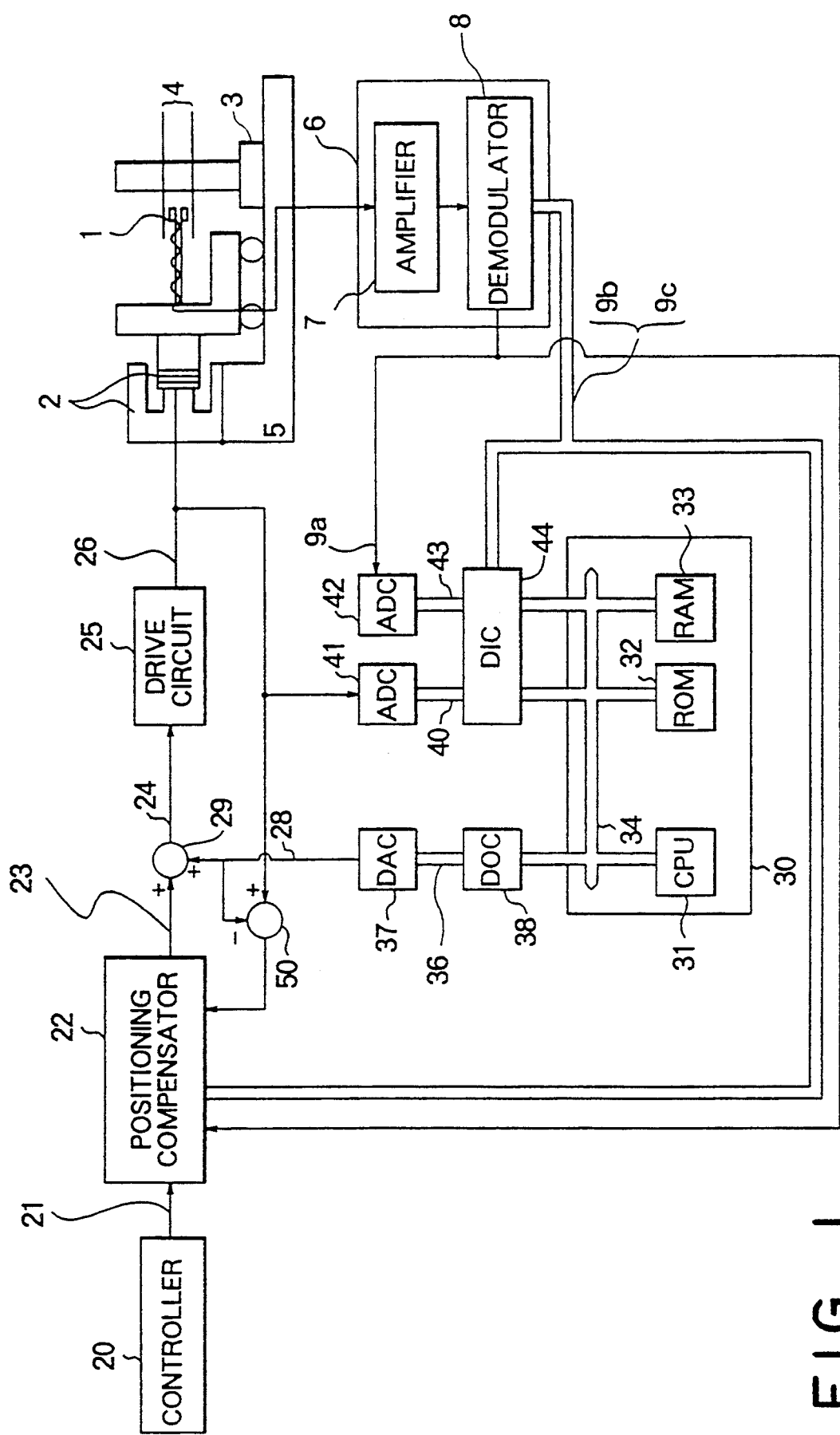
FIG. 1 shows a block diagram of a magnetic disk storage device in one embodiment of a disk storage device of the present invention.

FIG. 1 shows a block diagram of a magnetic disk device in one embodiment of the disk storage device of the present invention. In the present embodiment, a voice coil motor VCM 2 is used as an actuator. The VCM 2 radially positions a head 1 to a desired track on a disk 4. The disk 4 is rotatably driven by a spindle motor 3. Those units are mounted on a base 5. A position detector 6 comprises an amplifier 7 and a demodulator 8. A servo signal is recorded on the disk 4 and it is read by the head 1, amplified by the amplifier 7 and sent to a demodulator 8 which outputs a position error signal 9a representing a position error to a center of a closest track, a radial position signal 9b and a circumferential position signal 9c. The demodulator 8 generates a main position error signal PESN, not shown, and a sub-position error signal PESQ, not shown, which is phase-shifted by 90 degrees, and generates a position error signal PES 9a having a polarity matched to a head position based on the main position error signal PESN and +the sub-position error signal PESQ.

Figure 2A:
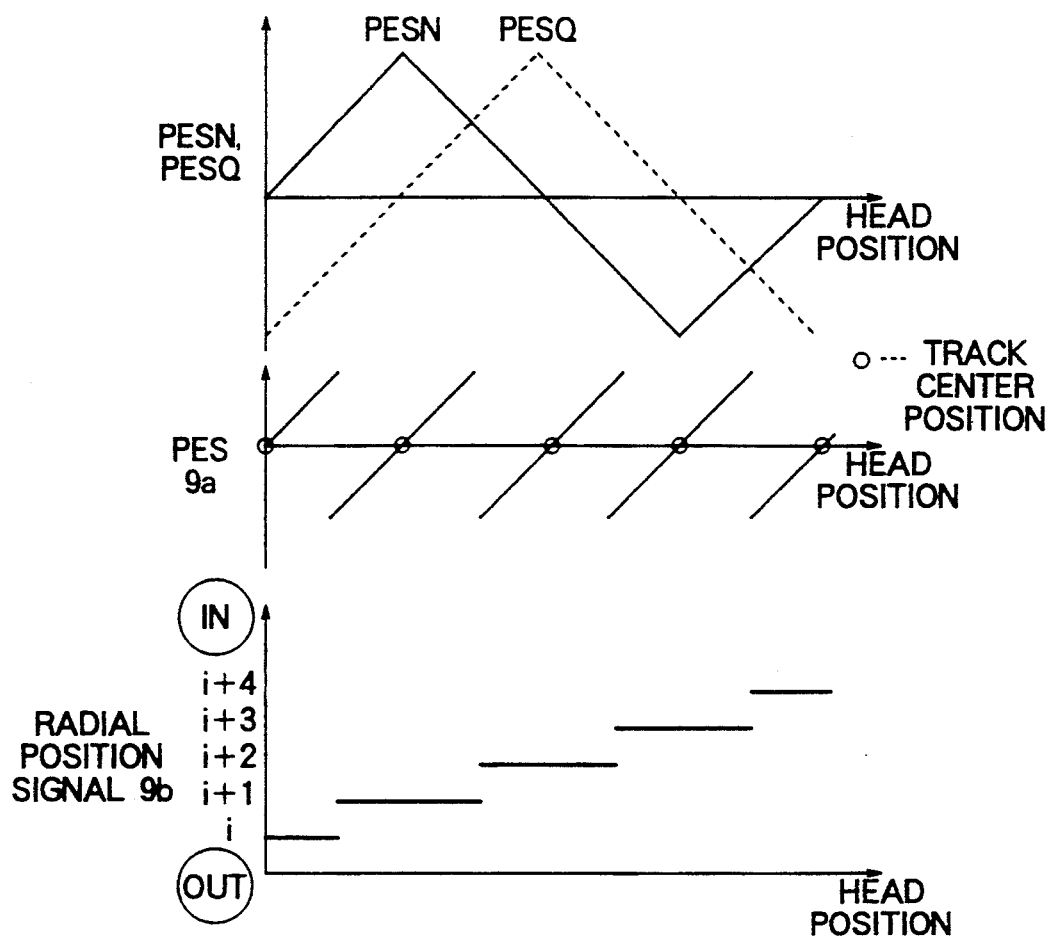
FIG. 2A shows a relation among a main position error signal PESN, a sub-position error signal PESQ and a position error signal PES 9a, FIG. 2B shows a relation between a radial position signal 9b and a circumferential position signal 9c.

FIG. 2A shows a relation among the main position error signal PESN, the sub-position error signal PESQ and the position error signal PES 9a. The radial position signal 9b is a track number represented by a digital signal which represents an absolute radial position of the head on the disk. A relation between the radial position signal 9b and the position error signal 9a is clearly shown in FIG. 2A.

Figure 2B:
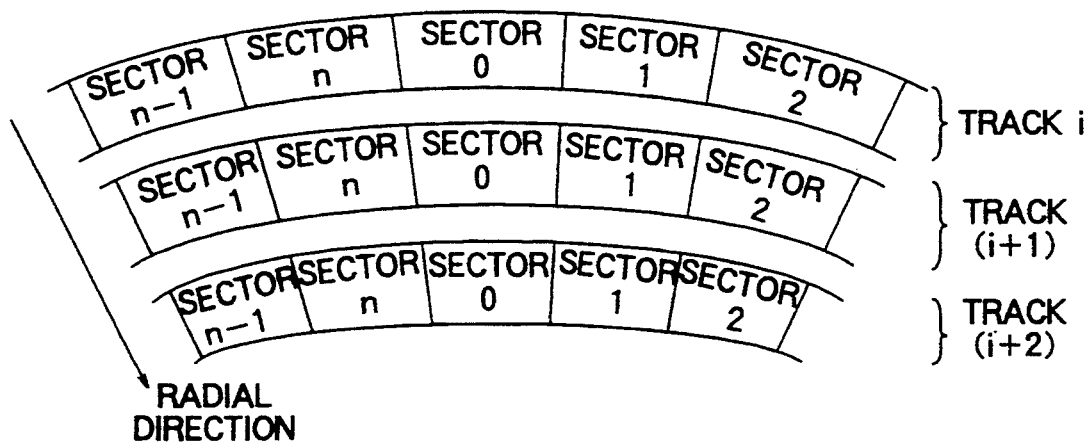

FIG. 2B shows a relation between the radial position signal 9b and the circumferential position signal 9c. The circumferential position signal 9c is a sector number represented by a digital signal which represents a circumferential position of the head on the disk. The relation between the radial position signal 9b and the circumferential position signal 9 is clearly shown in FIG. 2B.

When a controller 20 of FIG. 1 outputs a move command 21 to a positioning compensator 22, the positioning compensator 22 calculates a positioning signal 23. The positioning signal 23 may be calculated in a manner described in MEE & DANIEL "MAGNETIC RECORDING" Vol. 2. McGraw-Hill Book Company, pages 53–84, in which it is calculated by a velocity control system based on the position error signal 9a, the radial position signal 9b and the drive signal 26 such that the head 1 is brought close to a target track, and after it has been brought to the vicinity of the target track, it is calculated by a position control system. Usually, in the magnetic disk device, the action of moving the head a large distance when a position error is large is called a seek operation, and the action for positioning when the position error is small is called a following operation. Means for realizing the positioning compensator may be either an analog control system or a digital control system.

Estimation means for estimating external disturbance and vibration, memory means and correction means comprise a microcomputer 30, a digital output circuit DOC 38 for holding a digital external disturbance compensation signal. 36, a D/A converter DAC 37 for converting the digital external disturbance compensation signal 36 to an external disturbance compensation signal 28, a first A/D converter ADC 41 for converting a drive signal 26 to a digital drive signal 40, a second A/D converter ADC 42 for converting the position error signal 9a to a digital error signal 43, a digital input circuit DIC 44 for reading the radial position signal 9b, the circumferential position signal 9c, the digital drive signal 40 and the digital position error signal 43 into the microcomputer 30, and a first adder 29. The microcomputer 30 comprises a CPU 31, a ROM 32, a RAM 33 and a bus 34 connecting them.

The first adder 29 adds the external disturbance compensation signal 28 and the positioning signal 23 and outputs the sum as a drive signal 24. The external disturbance compensation signal 28 cancels an external force acting on the actuator VCM 2 and the external disturbance such as the vibration of the disk. As a result, in the disk storage device of the present invention, no steady position error or vibration occurs and the high speed and high precision head positioning is attained.

Figure 3:
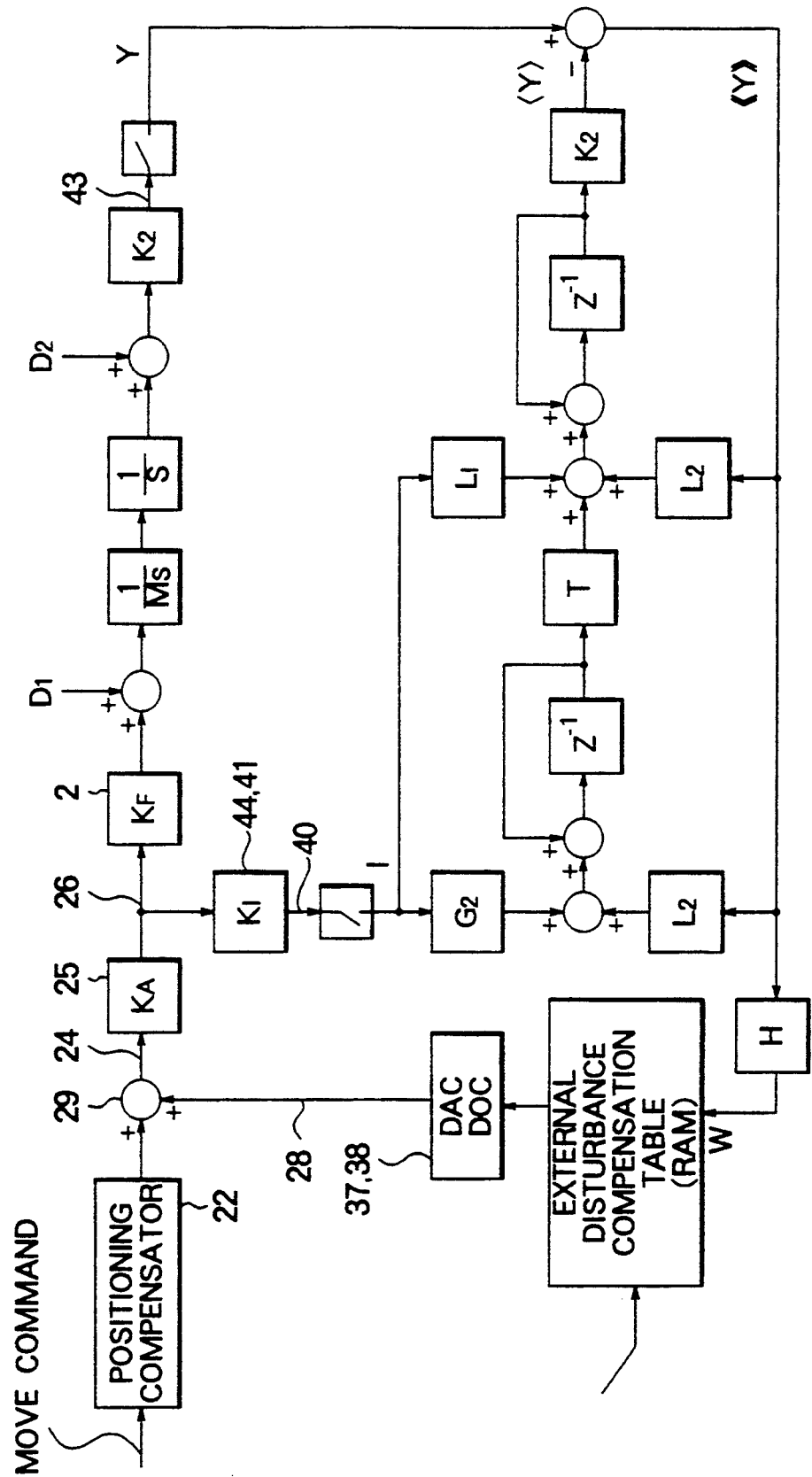
FIG. 3 shows a block diagram of a discrete time system indicating an algorithm realized by a microcomputer.

FIG. 3 shows a block diagram of a discrete time system for illustrating an algorithm realized in the microcomputer 30. In FIG. 3, $Z^{-1}$ means one sample delay. Other components are represented as a transfer function of a continuous time system. The notation "s" represents a Laplace operator. A gain of the drive circuit 25 is KA (A/V), a force constant of the VCM 2 is KF (N/A), a mass of a movable portion on which the head 1 is mounted is M (kg), a gain from the head radial position to the digital position error signal 43 is K2 (count/m), and a gain from the drive signal 26 to the digital drive signal 40 is KI (count/V). An external force D1 and the vibration D2 of the disk are applied as the external disturbance.

A method for deriving the digital external disturbance compensation value W by the microcomputer 30 is now explained. First, the drive signal 26 is converted to the digital drive signal 40 by the digital input circuit DIC 44 and the first AD converter ADC 41, the digital drive signal 40 is sampled, and the sampled result is stored as a variable I. The second A/D converter ADC 42 converts the position error signal 9a to the digital position error signal 43, and the digital input circuit DIC 44 samples the digital position error signal 43 and stores the sampled result as a variable Y. The radial position signal 9b and the circumferential position signal 9c are also sampled and the sampled results are stored as R and $\theta$, respectively.

Following to the sampling operation, a difference between the digital position error signal Y and the digital estimated position error signal $<Y>$ is calculated as shown in a formula (1) and it is stored as the digital estimated error signal $<<Y>>$.

$$<<Y>> = Y - <Y> \quad (1)$$

A product of the digital estimated error signal $<<Y>>$ and the gain H as shown in a formula (2) is stored as a digital external disturbance compensation value W.

$$W = H^* <<Y>> \quad (2)$$

In preparation for the next sampling, a digital estimated position signal represented by a formula (3) is calculated and it is stored as a variable $<X1>$.

$$<X1> = <X1> + T^*<X2> + G1^*I + L1^*<Y> \quad (3)$$

Then, a digital estimated velocity signal represented by a formula (4) is calculated and it is stored as a variable $<X2>$.

$$<X2> = <X2> + G2^*I + L2^*<<Y>> \quad (4)$$

A digital estimated position error signal represented by a formula (5) is calculated and it is stored as a variable $<Y>$.

$$<Y> = K2^*<X1> \quad (5)$$

The microcomputer 30 repeats the operations (1) to (5) at an interval of T seconds.

In FIG. 3, gains G1, G2, L1, L2 and H are gains of the identity observer of the discrete time system generated from a transfer function model from the drive signal 26 to the digital position error signal Y and they are determined as shown in formulas (6) to (10).

$$G1 = KF^*T^2/(2M) \quad (6)$$

$$G2 = KF^*T/M(T) \quad (7)$$

$$L1 = 2\{1 - \exp(-2\ \omega T)\cos(\omega T\sqrt{(1-\ ^2)})\}/K2 \quad (8)$$

$$L2 = \{1 + \exp(-2\ \omega T) - 2\exp(-\ \omega T)\\ \cdot\cos(\omega T\sqrt{(1-\ ^2)})\}/TK2 \quad (9)$$

$$H = -M^*L2/(KF^*T^*KA) \quad (10)$$

In the formulas (8) and (9), e and represent an estimation speed and an attenuation characteristic, respectively. In this case, ω may be set to be several times as high as an angular frequency of a vibration to be suppressed, and may be set to approximately 0.7.

When there is no external force acting on a head movable portion or vibration synchronized with the rotation of the disk 4, the digital estimated position error signal <Y> calculated in the manner described above coincides with the digital position error signal Y. However, when the external disturbance or the vibration is present, there is an error between the digital position error signal Y and the digital estimated position error signal <Y>. This error is due to the external disturbance and the vibration, and the digital external disturbance compensation value W derived by amplifying the digital estimated error signal <<Y>> which is derived by amplifying the error is a signal necessary to cancel the external disturbance such as the external force and the vibration.

The digital external disturbance compensation signal W which is derived by amplifying the digital estimated error signal <<Y>> may be fed back as part of the drive signal. However, a delay is included in the feedback and the performance due to the noise included in the position signal may be deteriorated by the delay by the feedback.

Thus, in order to reduce the effect by the non-reproducible noise and prevent the delay by the feedback, a synchronous external disturbance compensation signal which is a mean value of the external disturbance compensation values averaged for each circumferential position during a plurality of revolutions of the disk is stored in the RAM 33 in a form of an external disturbance compensation signal table as a function of the position of the head on the disk.

Figure 4:
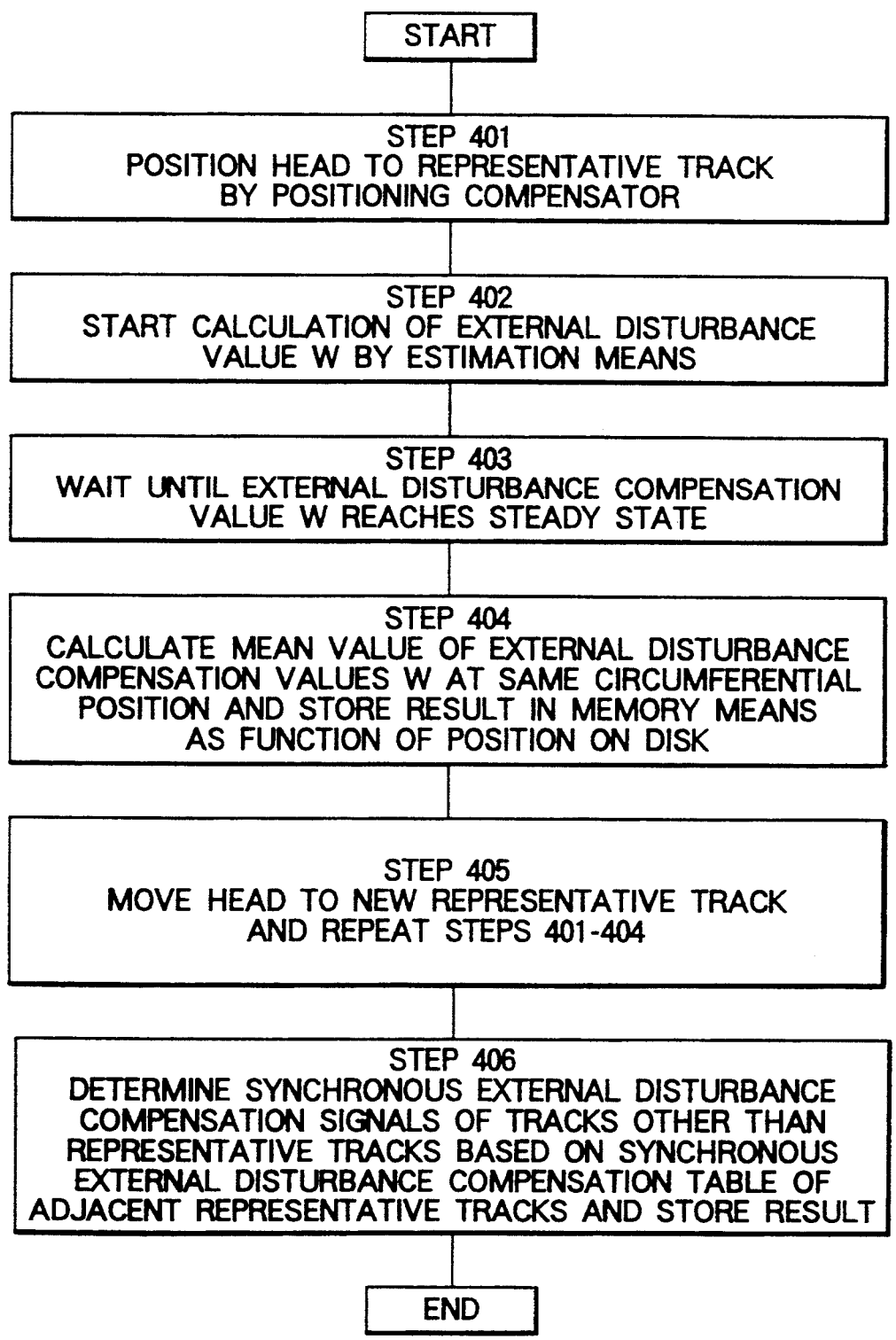
FIG. 4 shows a flow chart of a procedure for preparing a synchronous external disturbance table for storing a synchronous external disturbance compensation signal of the first embodiment.

FIG. 4 shows a flow chart of a procedure for generating a synchronous external disturbance compensation table for storing a synchronous external disturbance compensation signal.

In a step 401, the head 1 is positioned to representative track by the positioning compensator 22. In step 402, the calculation of the external disturbance compensation value W is started by the estimation means following the positioning operation.

In step 403, it waits until the external disturbance compensation value W reaches a stable state.

In step 404, a mean value of the external disturbance compensation values at the same circumferential position is calculated and the result is stored as a function of the position on the disk. For example, in order to calculate a synchronous external disturbance compensation signal $W_{ave}(\theta)$ at the circumferential position $\theta$ during 100 revolutions of the disk at the track number R as a representative track, a mean value of the external disturbance compensation values at the same circumferential position in the first to 100th revolutions after the following is calculated. Assuming that the track number is R, the circumferential position is $\theta$ and the external disturbance compensation signal $W_{ave}$ in the k-th revolution is $W(R, \theta, k)$, the synchronous external disturbance compensation signal $W_{ave}(R, \theta)$ in the track number R and at the circumferential position $\theta$ is given by $$W_{ave}(R,\theta)=\{\Sigma W(R,\theta,k)\}/100 \quad (11)$$

where Σ (summation) is from k=1 to 100. The formula (11) is calculated at each circumferential position and $W_{ave}(R, \theta)$, where $\theta=0, 1, \ldots \theta_{max}$, is stored in the external disturbance compensation table.

In step 405, the head is moved to a new representative track and the steps 401 to 404 are repeated. The representative track may be one track on the disk or all tracks, or a plurality of tracks.

In step 406, the synchronous external disturbance compensation signal of the track not selected as the representative track is determined by interpolating from the synchronous external disturbance compensation table of the close representative track. In the interpolation method when the representative tracks are plural, two data at the same circumferential position $\theta$ of the external disturbance compensation tables $W_{ave}$ (R1, $\theta$)and $W_{ave}$ (R2, $\theta$) of the two adjacent representative tracks, where $\theta=0, 1, 2, \ldots \theta_{max}$), are approximated by a linear formula and the synchronous external disturbance compensation signal at the circumferential position $\theta$ for other track is calculated. The above operation is conducted for all circumferential positions to generate the synchronous external disturbance compensation tables for all areas on the disk. In the interpolation when the representative track is one, the 0-order interpolation is conducted, that is, the synchronous external disturbance compensation signals of all tracks are identical, and no new table is generated.

In this manner, the synchronous external disturbance compensation tables are stored as the function of the position on the disk and the digital external disturbance compensation signal 36 is output to the first adder 29 as the feedforward signal in accordance with the position of the head 1 on the disk, through the digital output circuit DOC 38 and the D/A converter DAC 37. By outputting the feedforward signal, the seek control system for moving the head to the target track and the following control system for positioning the head to the target track are continuously activated to suppress the external disturbance.

Figure 5:
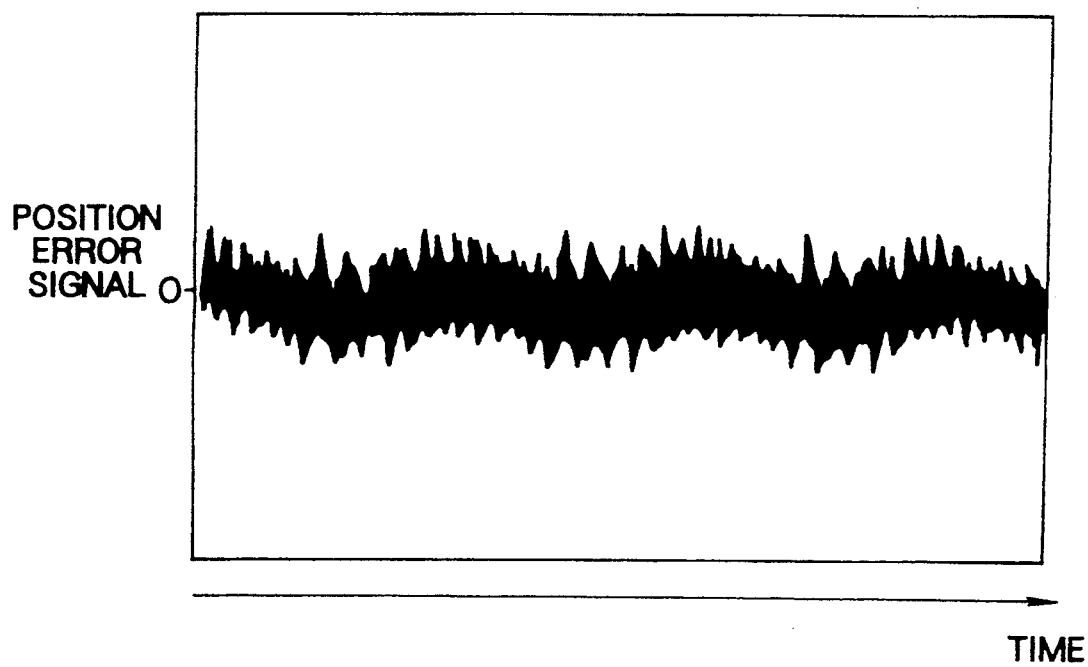
FIG. 5 shows a response of a prior art head positioning control system in an active status of a following control system.
Figure 6:
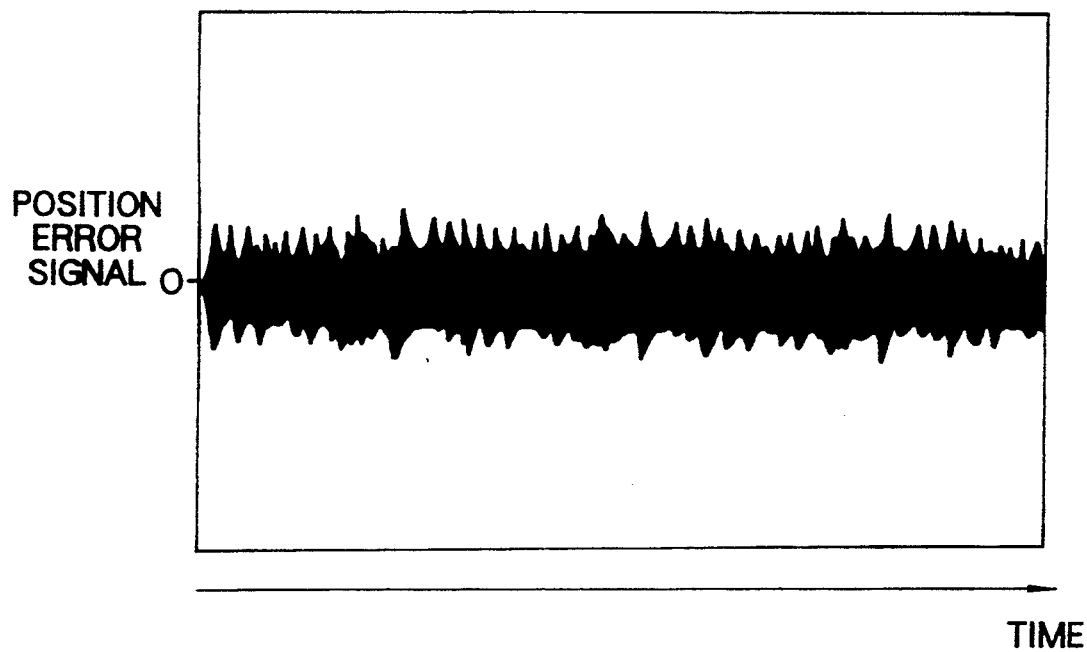
FIG. 6 shows a response of a head positioning control system of the present invention in an active status of a following control system.
Figure 7:
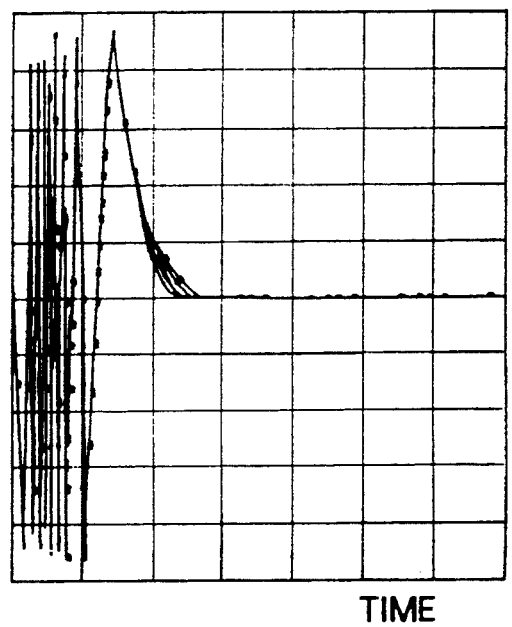
FIG. 7 shows a response waveform in the prior art head positioning control system.

FIG. 5 shows a response in a prior art control system in an activated status of the following control system. FIG. 6 shows a response of the control system of the present invention in an activated status of the following control system. As seen from the comparison of both responses, the vibration occurring in the prior art system of FIG. 5 is reduced in the present invention of FIG. 6 to reduce the access time and improve the positioning precision.

In generating the synchronous external disturbance compensation table, in step 404 of FIG. 4, the external disturbance compensation values at the same circumferential position of the head are synchronously added during a plurality of revolutions of the disk to reduce the non-reproducible noise. In an alternative step of the step 404, an average of movement of the external disturbance compensation value at the circumferential position in one sample and the external disturbance compensation values calculated continuously before and after thereof is calculated. In this method, the noise component included in the external disturbance compensation value is cut and the same effect is attained.

In the positioning compensator having the velocity estimation means for combining the differentiated signal of the position signal passed through the low-pass filter and the integrated drive signal passed through the high-pass filter to estimate the velocity signal, an error is included in the velocity estimated result if the external disturbance included in the position signal. In the disk storage device in which the disk 4 is eccentric, if the prior art control system is used and a certain number of tracks are repeatedly sought and followed, there is a variation in the response of the position error signal when the mode is switched from the seek mode to the following mode.

On the other hand, in the present invention, the external disturbance compensation signal is added to the positioning signal by the first adder 29 to cancel the external disturbance. Accordingly, the external disturbance is not included in the position signal applied to the velocity estimation means and the effect of the external disturbance is eliminated.

On the other hand, since the signal for cancelling the external disturbance is included in the drive signal by the correction of the first adder 29, the velocity estimation signal for estimating the velocity signal from the drive signal is affected by the external disturbance and there is a variation in the response of the control system.

Figure 8:
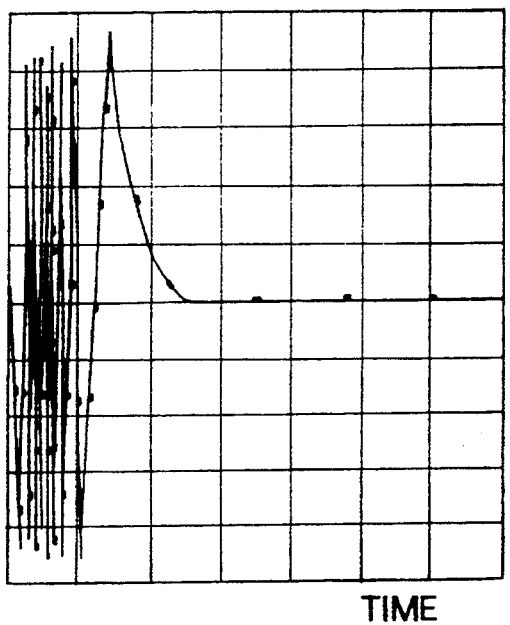
FIG. 8 shows a response waveform in the head positioning control system of the present invention.

In order to suppress such effect, in the disk storage device of the present invention, a second adder 50 is provided to supply a signal which is a difference between the drive signal and the external disturbance compensation signal to the velocity estimation means instead of the drive signal. By this correction, the velocity estimation means is less affected by the external disturbance and the variation in the response of the positioning control system is reduced. A waveform of response in the repetitive seek and follow is shown in FIG. 8. It is seen that the variation in the response is eliminated in spite of the fact that the external disturbance acts by the eccentricity of the disk.

<Second Embodiment>

In the present embodiment, the hardware is same as that of the disk storage device of the first embodiment. The method for calculating the external disturbance compensation value calculated by the estimation means is also same as that described in the first embodiment.

Figure 9:
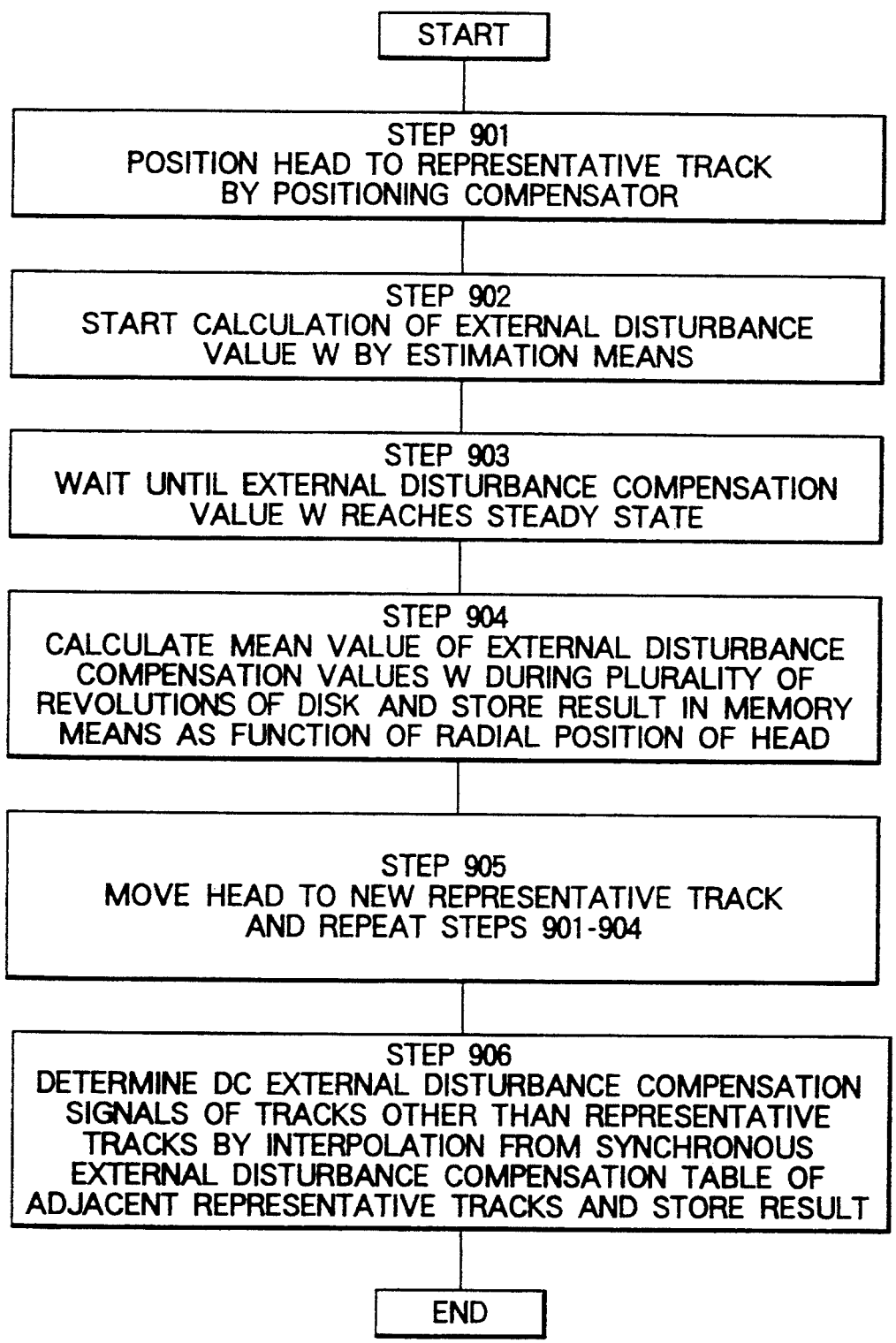
FIG. 9 shows a flow chart of a procedure for operating a DC external disturbance signal and preparing an external disturbance table in a second embodiment.

FIG. 9 shows a procedure of the calculation of a DC external disturbance compensation signal and the generation of the external disturbance compensation table in the present embodiment. Referring to FIG. 9, the procedure for the calculation of the DC external disturbance compensation signal after the calculation of the external disturbance compensation value and the generation of the external disturbance compensation table in the present embodiment is explained.

In step 901, the head is positioned to a representative track by the positioning compensator.

In step 902, following the start of the positioning operation, the external disturbance compensation value W is calculated by the estimation means.

In step 903, it waits until the external disturbance compensation value W reaches a steady state.

In step 904, a mean value of the external disturbance compensation values W is calculated during a plurality of revolutions of the disk and the calculated result is stored in the memory means as a function of the radial position of the head. For example, in order to calculate the DC external disturbance compensation signal $W_{DC}(R)$ during one revolution in the track number R as the representative track, it is necessary to calculate a mean value of one revolution of external disturbance compensation values by the following. Assuming that the track number is R and the external disturbance compensation value at the circumferential position $\theta$ is W (R, $\theta$), the DC external disturbance compensation signal $W_{DC}(R)$ of the track R is given by $$W_{DC}(R) = \{\Sigma W(R,\theta)\}/(\theta max+1) \quad (12)$$

where $\Sigma$ (summation) is from $\theta=0$ to $\theta=\theta_{max}$.

In step 905, the head is moved to a new representative track and the steps 901 to 904 are repeated. The representative track may be one track on the disk or all tracks or a plurality of tracks.

In step 906, the DC external disturbance compensation signal for the track not selected as the representative track is determined by the interpolation from the DC external disturbance compensation table of the neighboring representative track. In the interpolation when the representative tracks are plural, the DC external disturbance compensation signals of the two neighboring representative tracks are approximated by linear formulas to prepare the table. When the representative track is one, the 0-order interpolation is conducted, that is, the DC external disturbance compensation signals of all tracks are identical and no new table is generated.

The DC external disturbance compensation table is stored as the function of the radial position of the head on the disk and the data stored in the DC external disturbance compensation table is output to the first adder 29 as the feedforward signal through the digital output circuit 38 and the DA converter 37. By the correction by the feedforward signal, the seek control system for moving the head to a target track and the following control system for positioning the head to the target track are always activated to suppress the external disturbance and shorten the access time and improve the positioning precision.

Where the velocity estimation means is included as the positioning compensator 22, the correction operation by the second adder 50 eliminates the effect of the external disturbance to the velocity estimation means and reduces a difference in the response due to the difference in the direction of movement of the seek control system.

<Third Embodiment>

In the present embodiment, the hardware is same as that of the disk storage device of the first embodiment. The method for calculating the external disturbance compensation value by the estimation means is also same as that described in the first embodiment. The method for calculating the DC external disturbance compensation signal is same as that described in the second embodiment.

Figure 10:
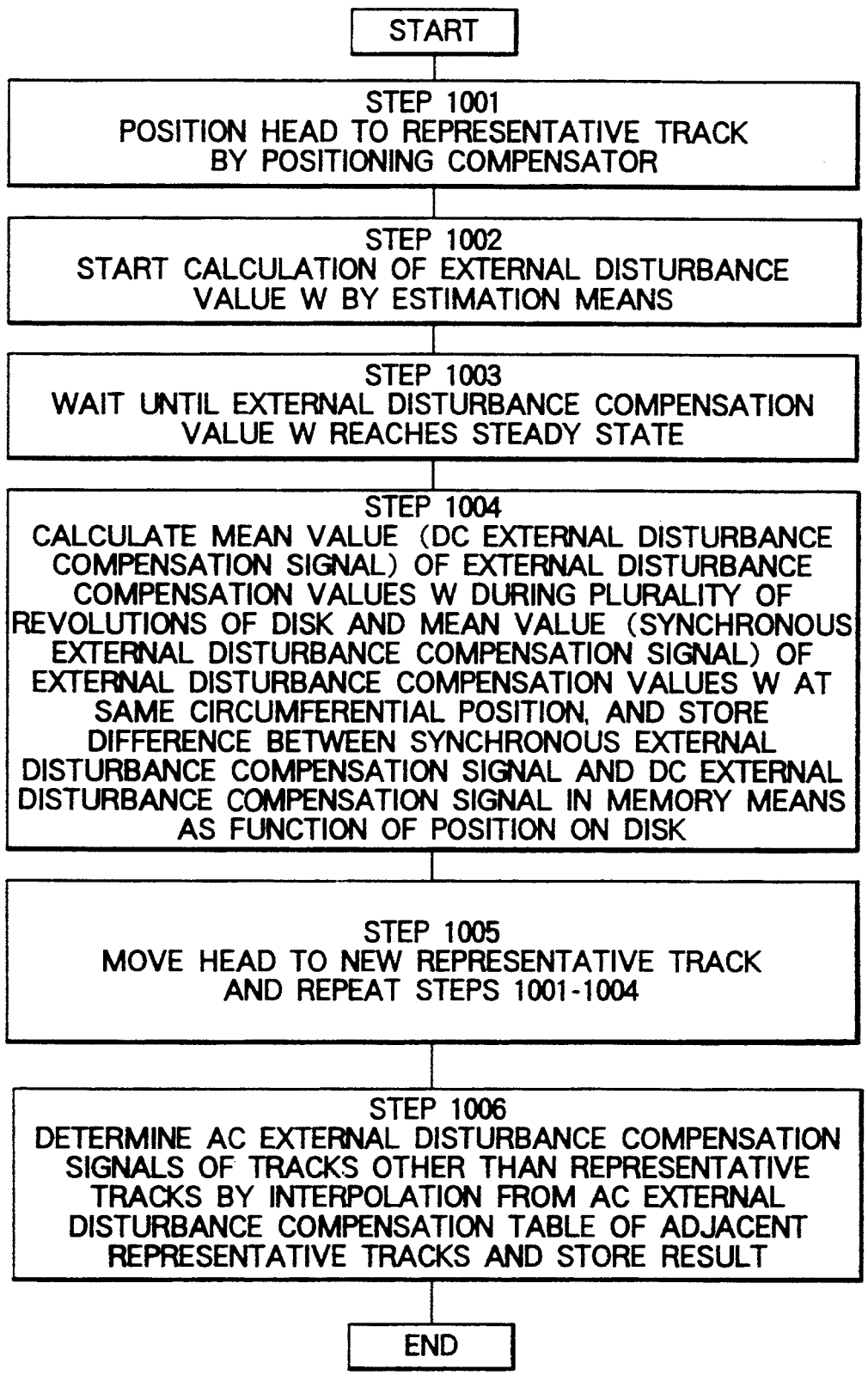
FIG. 10 shows a flow chart of a procedure for operating an AC external disturbance signal and preparing an external disturbance table in a third embodiment.

FIG. 10 shows a flow chart of a procedure of the calculation of an AC external disturbance compensation signal and the generation of an external disturbance compensation table in the present embodiment. Referring to FIG. 10, the procedure of the calculation of the AC external disturbance compensation signal after the calculation of the external disturbance compensation value and the generation of the external disturbance compensation table is explained.

In step 1001, the head is positioned to a representative track by the positioning compensator.

In step 1002, following the start of the positioning operation, the calculation of the external disturbance compensation value W by the estimation means is started.

In step 1003, it waits until the external disturbance compensation value W reaches a steady state.

In step 1004, a mean value (a DC external disturbance compensation signal) of the external disturbance compensation values W and a mean value (a synchronous external disturbance compensation signal) of the external disturbance compensation values in the same circumferential direction are calculated during a plurality of revolutions of the disk, and a difference (an AC external disturbance compensation signal) between the synchronous external disturbance compensation signal and the DC external disturbance compensation signal is stored in the memory means as the function of the position on the disk. The AC external disturbance compensation signal $W_{AC}(R, \theta)$ in the track R and at the circumferential position $\theta$ is given by the synchronous external disturbance compensation signal $W_{ave}(R, \theta)$ and the DC external disturbance compensation signal $W_{DC}(R)$ as follows.

$$W_{AC}(R,\theta) = W_{AVE}(R,\theta) - W_{DC}(R) \quad (13)$$

In step 1005, the head is moved to a new representative track and the steps 1001 to 1004 are repeated. The representative track may be one track on the disk or all tracks or a plurality of tracks.

In step 1006, the DC external disturbance compensation signal of the track not selected as the representative track is determined by the interpolation from the AC external disturbance compensation table of the neighboring representative track. Where the representative tracks are plural, the AC external disturbance compensation signals of the two neighboring representative tracks are approximated by linear formulas to generate a table. Where the representative track is one, the 0-order interpolation is conducted, that is, the DC external disturbance compensation signals of all tracks are identical and no new table is generated.

In this manner, the AC external disturbance compensation table is stored as the function of the position on the disk, and the data stored in the AC external disturbance compensation table is output to the first adder 29 as the feedforward signal through the digital output circuit DOC 38 and the D/A converter DAC 37. By outputting the feedforward signal, the seek control system for moving the head to a target track and the following control system for positioning the head to the target track are always activated to suppress the external disturbance, shorten the access time and improve the positioning precision. By the correction means by the second adder 50, the variation in the responses of the seek and the following due to the eccentricity of the disk is eliminated.

<Fourth Embodiment>

In the present embodiment, the hardware is same as that of the disk storage device of the first embodiment. The method for calculating the external disturbance compensation value by the estimation means is also same as that described in the first embodiment. Further, the method for calculating the DC external disturbance compensation signal and the AC external disturbance compensation signal is same as those explained in the second and third embodiments.

First, the DC external disturbance compensation table is generated in accordance with the procedure of the generation of the DC external disturbance compensation signal table shown in FIG. 9, and the AC external disturbance compensation table is generated in accordance with the procedure of the generation of the AC external disturbance compensation signal table shown in FIG. 10.

After the generation of the tables, a sum signal of the AC external disturbance compensation signal and the DC external disturbance compensation signal, in accordance with the position of the head 1 on the disk, is output to the first adder 29 as the external disturbance compensation signal for the feedforward control through the digital output circuit 38 and the DA converter 37. By outputting the feedforward signal, the seek control system for moving the head to a target track and the following control system for positioning the head to the target track are always activated to suppress the external disturbance, shorten the access time and improve the positioning precision.

In the correction method by the second adder 50, the variation in the response of the seek mode and the following mode due the eccentricity of the disk is eliminated as it is in the first embodiment.

The present embodiment is effective when the DC external disturbance varies with the radial position of the head but the AC external disturbance does not vary. By generating the DC external disturbance compensation table from a plurality of representative tracks and generating the AC external disturbance compensation table from one representative track, the memory for generating the tables can be saved.

In accordance with the present invention, even if the external disturbance or the vibration acts on the positioning control system, the delay due to the feedback compensation is reduced and the access time is shortened, the head is precisely positioned and the variation in the positioning operation by the external disturbance is reduced while the stability to the position signal including the noise is secured and the external disturbance is suppressed.

Other embodiments of the present invention are now explained with reference to FIGS. 11 to 20.

<Fifth Embodiment>

Figure 11:
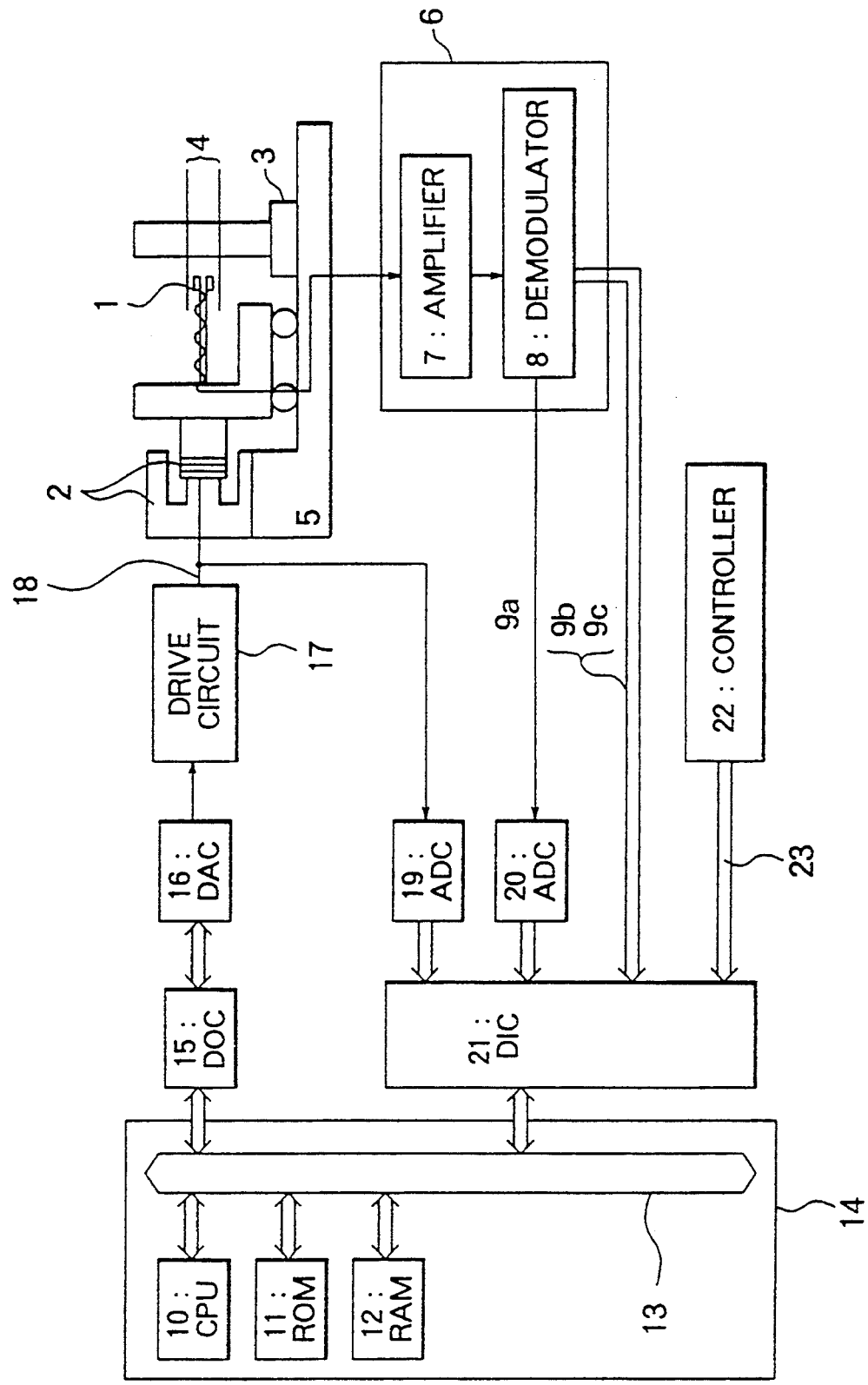
FIG. 11 shows a block diagram of a hardware configuration in other embodiment of a positioning control system of a magnetic disk device in accordance with the present invention.

One embodiment of the present invention is explained with reference to the drawings. FIG. 11 shows a block diagram of a hardware configuration when a positioning control system of a magnetic disk device in one embodiment of the present invention is realized by a digital control system. In FIG. 11, a voice coil motor (VCM) 2 is used as an actuator. The VCM 2 can move and radially position a head 1 of a disk 4 rotated by a spindle motor 3 to a desired track. Those units are mounted on a base 5. A position detector 6 comprises an amplifier 7 and a demodulator 8.

Figure 12A:
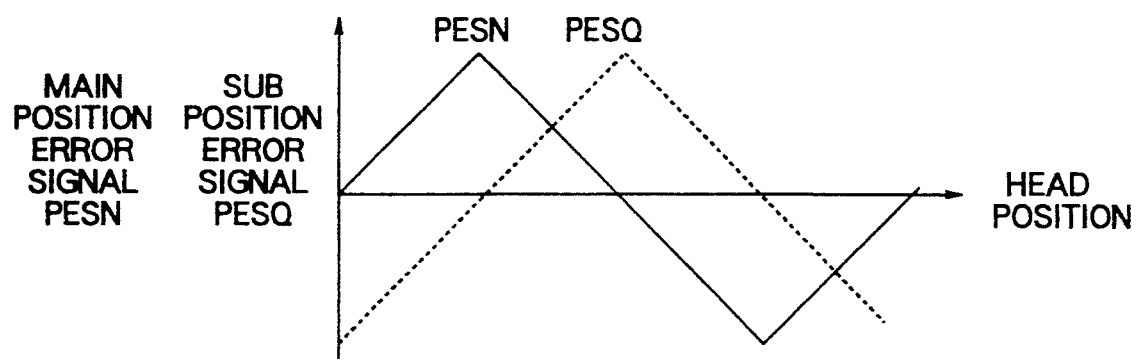
FIG. 12 shows a position signal in the magnetic disk device.
Figure 12B:
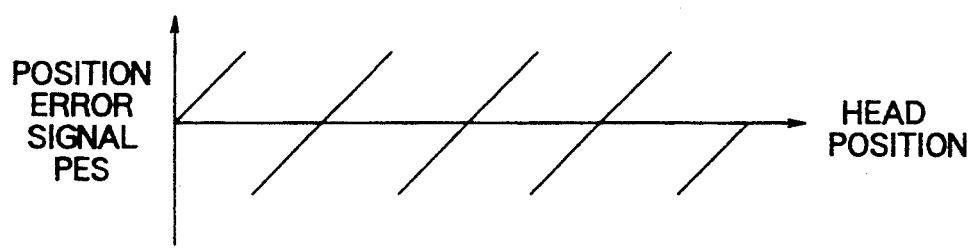
Figure 12C:
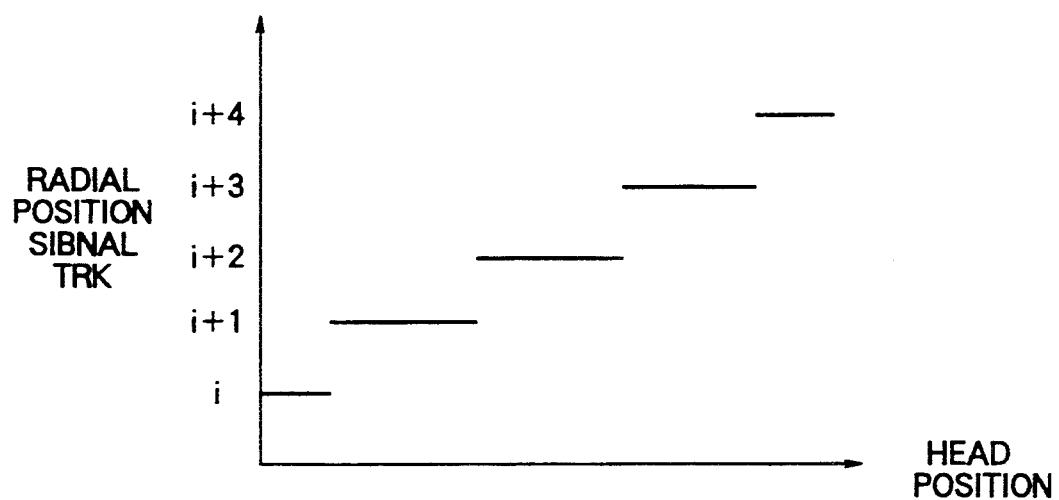
Figure 13:
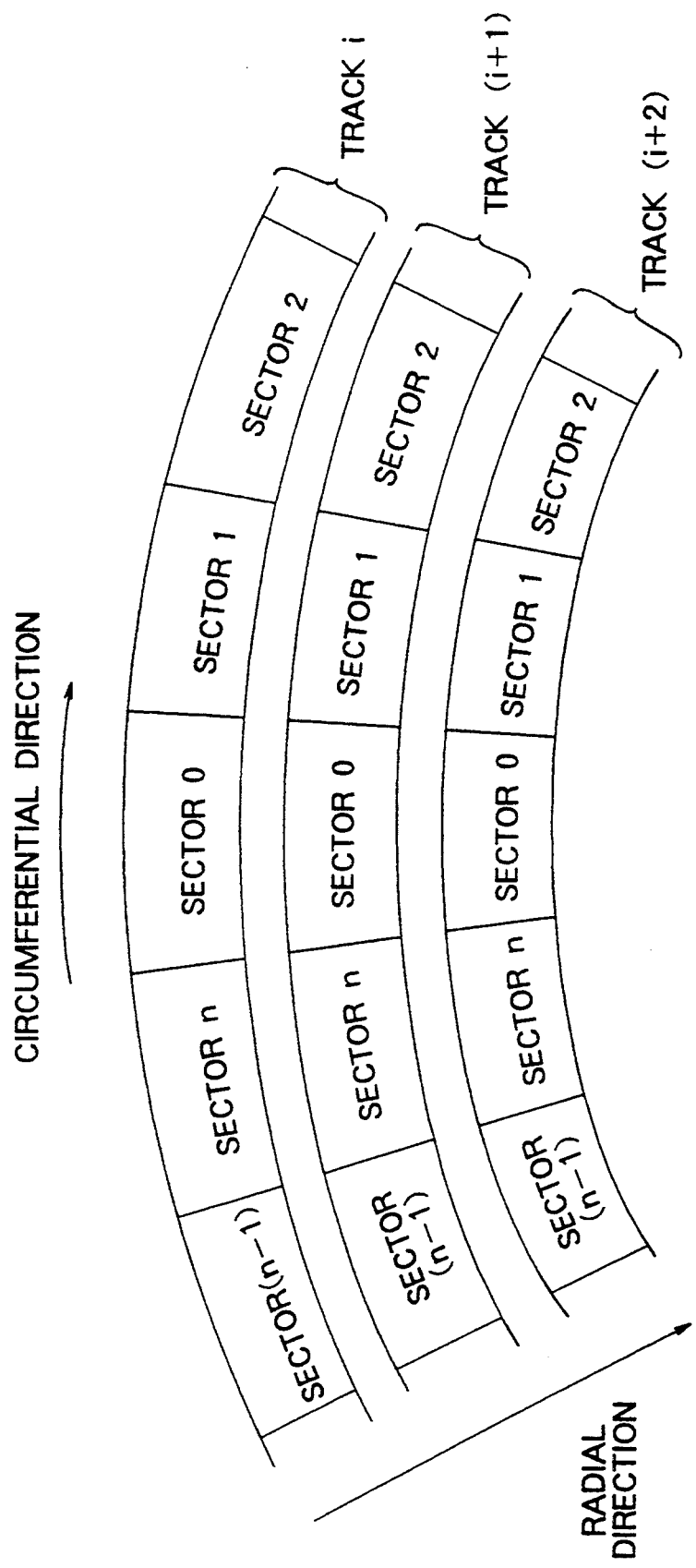
FIG. 13 shows a position signal in the magnetic disk device.

A servo signal is recorded on the disk 4 and the servo signal read by the head 1 is amplified by the amplifier 7 and supplied to the demodulator 8, which outputs a position error signal 9a representing a position error to a center of the closest track, a radial position signal (TRK) 9b and a circumferential position signal (SECTOR) 9c as position signals. The demodulator 8 generates a sub-position error signal PESQ (not shown) whose phase is different from that of a main position error signal PESN (not shown) by 90 degrees, and generates the position error signal (PES) 9a having a polarity thereof matched to the head position based on PESN and PESQ and outputs it. The radial position signal (TRK) 9b is a digital signal represented by a track number which represents an absolute radial position of the head on the disk. A relation among the signals PESN, PESQ, PES and TRK is shown in FIG. 12. The circumferential position signal 9c is a sector number which represents the circumferential position of the head on the disk by a digital signal. A relation between the radial position signal and the circumferential position signal is clearly shown in FIG. 13.

Means for realizing the present invention comprises a microcomputer system 14 including a CPU 10, a ROM (read-only memory) 11, a RAM (random access memory) 12 and a bus 13 for interconnecting them, a digital output circuit (DOC) 15 for holding a digital control signal, a D/A converter (DAC) 16 for converting the digital control signal to a control signal, a first A/D converter (ADC) 19 for converting a drive signal 18 to a digital drive signal, a second A/D converter (ADC) 20 for converting the position error signal (PES) 9a to a digital position error signal, and a digital input circuit (DIC) 21 for reading the radial position signal (TRK) 9b, the circumferential position signal (SECTOR) 9c, the digital drive signal and the digital position error signal into the microcomputer system.

In the digital control system shown in FIG. 11, a position signal Y is generated by software in the microcomputer based on the position error signal (PES) 9a and the radial position error signal (TRK) 9b. A signal flow realized by the software is now explained with reference to a block diagram of the control system shown in FIG. 14. Assuming that a detection gain from the head position to the position error signal (PES) 9a is Kp and a detection gain from the head position to the radial position signal (TRK) 9b is Kp', the position signal Y is given by $$Y = PES + KP^*TRK/KP \qquad (1)$$

When a controller 22 issues a move command 23 to a positioning compensator, the positioning compensator 24 calculates a positioning compensation signal V such that the position signal Y matches to a target position signal supplied from the controller. The positioning compensation signal V may be calculated in a manner described in MAGNETIC RECORDING by MEE & DANIEL, Vol. 2 (McGraw-Hill Book Company) pages 53-84, in which it is calculated based on the position error signal 9a, the radial position signal 9b and the drive signal 18 until the head 1 is moved to the vicinity of the target track, and it is calculated by the position control system after the head 1 has been brought to the vicinity of the target track. Usually, in the magnetic disk device, an action to move the head by a large distance when the position error is large is called a seek operation, and an action to position the head when the position error is small is called a following operation. The means for realizing the positioning compensator may either be an analog control system or a digital control system. In the following description of the present invention, a digital control system is used.

Figure 14:
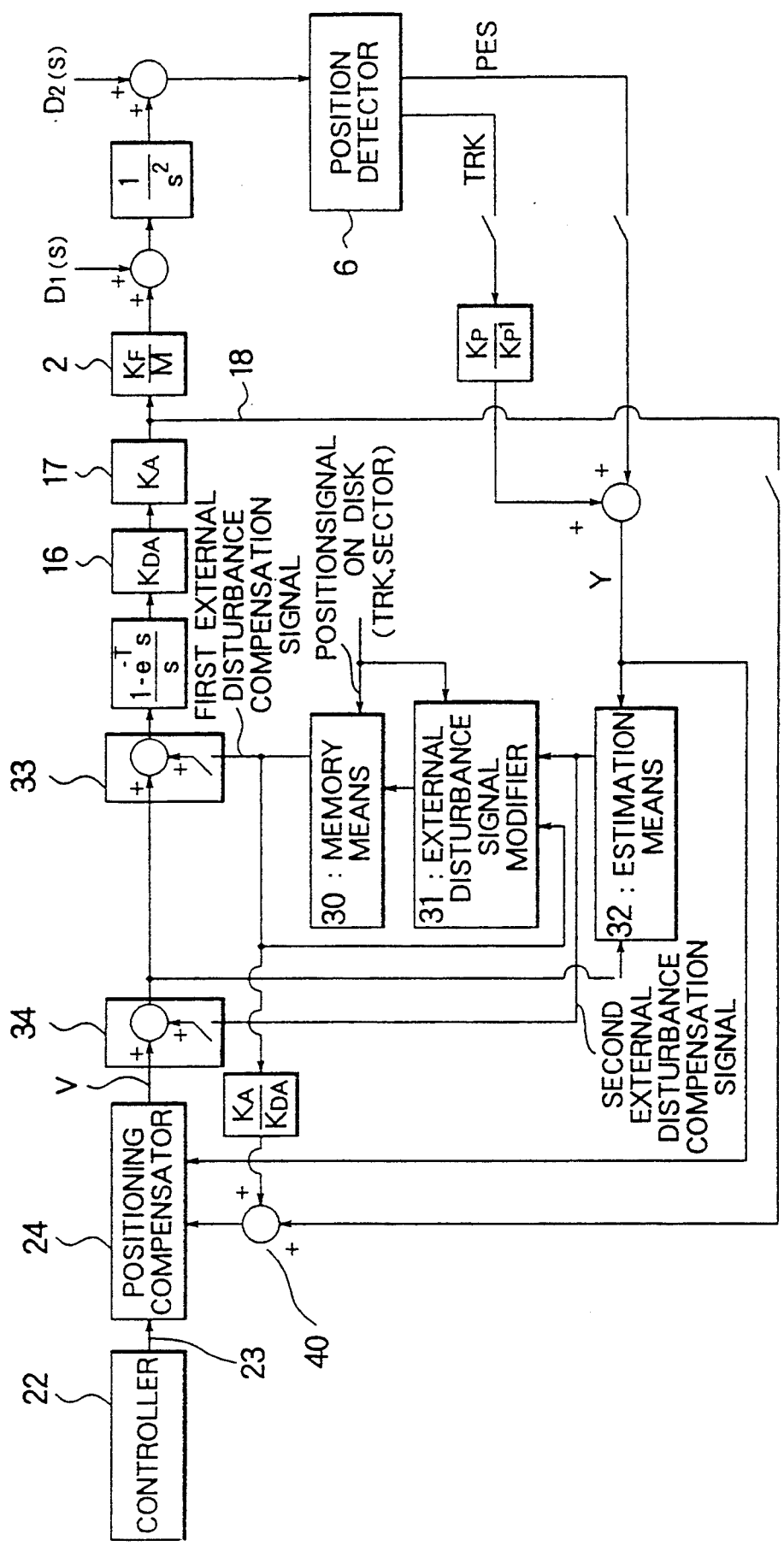
FIG. 14 shows a block diagram of a software configuration of a positioning control system of a magnetic disk device in accordance with the present invention.

FIG. 14 shows a block diagram of a discrete time system representing a signal flow in the microcomputer system. A portion to be controlled is represented by a transfer function of a continuous time system. A symbol s denotes a Laplace operator and T denotes a sampling period (second) of the digital control system. A model of the D/A converter (DAC) 16 is represented by a zero-order holder characteristic (formula (2)) and a gain $K_{DA}$ (V/count).

$$H_{ZOH}(s) = \{1 - EXP(-sT)\}/s \qquad (2)$$

It is assumed that a voltage-current conversion gain of the drive circuit 17 is $K_A$(A/V), a force constant of the VCM 2 is $K_F$(N/A), a mass of a movable portion on which the head 1 is mounted is M (kg), and an acceleration external disturbance $D_1$ and a position external disturbance (vibration) $D_2$ are applied as the external disturbance.

In the present embodiment, memory means 30, external disturbance compensation signal modifier 31, estimation means 32, first correction means 33 and second correction means 34 operate in the following manner immediately after the power-on.

The head is moved to a representative track and followed, and the first external disturbance compensation signal stored in the memory means 30 is output. Simultaneously, the first correction means 33 and the estimation means 32 are activated. Immediately after the power-on, the first external disturbance compensation signal stored in the memory means 30 is zero. Namely, the second external disturbance compensation signal estimated by the estimation means 32 attempts to cancel the external disturbance acting on the portion to be controlled. At this time, the external disturbance compensation modifier 31 stores a sum of the first external disturbance compensation signal and the second external disturbance compensation signal in the memory means in accordance with the position of the head on the disk (TRK, SECTOR). The sum of the first external disturbance compensation signal and the second external disturbance compensation signal may be directly stored in the memory means 30 but it is more effective to store it in the memory means 30 after it has been passed through a low-pass filter to reduce a non-reproducible noise and the effect of the vibration. When the first external disturbance compensation signal has been updated by the external disturbance compensation signal modifier 31, the estimation means 32 and the external disturbance compensation signal modifier 31 are deactivated (step 1).

Then, the first external disturbance compensation signal stored in the memory means 30 is read from the memory means 30 in accordance with the head position (TRK,SECTOR) on the disk, and it is corrected by the first correction means 33 to cancel the periodic external disturbance acting on the portion to be controlled. As a result, the rotating synchronous vibration due to the eccentricity of the disk is reduced. Under this condition, the estimation means 32 is activated. Since the apparent external disturbance acting on the portion to be controlled is reduced by the first external disturbance compensation signal, the estimation means attempts to cancel the external disturbance which has not been compensated by the first external disturbance compensation signal. The external disturbance compensation signal modifier 31 stores the sum of the first external disturbance compensation signal and the second external disturbance compensation signal in the memory means 30 in accordance with the head position (TRK, SECTOR) on the disk. The sum of the first external disturbance compensation signal and the second external disturbance compensation signal may be directly stored in the memory means 30 but it is more effective to store it in the memory means 30 after it has been passed through a low-pass filter to reduce a non-reproducible noise and the vibration. When the first external disturbance compensation signal has been updated by the external disturbance compensation signal modifier 31, the estimation means 32 and the external disturbance compensation signal modifier 31 are deactivated (step 2).

The step 2 is repeated. As a result, the effect of cancelling the periodic external disturbance is gradually enhanced. In step 2, the effect of cancelling the external disturbance is double of that in step 1, and by repeating step 2, the effect of cancelling the external disturbance is enhanced to three times, four times, and so on. The repetition of step 2 is stopped at an appropriate number of times (step 3).

The head is moved to a new representative track and steps 1 to 3 are repeated (step 4).

The first external disturbance compensation signal for the track not selected as the representative track is determined by the interpolation from the first external disturbance compensation signal data for the representative track. The interpolation may be conducted by selecting two neighboring representative tracks to make linear interpolation or selecting three neighboring representative tracks to make second-order interpolation. A simplest method of interpolation is zero-order interpolation, that is, to use the first external disturbance compensation signal data of one representative track to other tracks as it is (step 5).

The seek control and the following control are conducted while the first correction means 33 is activated. Thus, the periodic external disturbance synchronized with the rotation is reduced. The external disturbance which is not synchronous with the rotation such as the vibration may also be cancelled by activating the estimation means 32 and the second correction means 34 (step 6).

The operation of the estimation means 32 is explained in more detail with reference to a block diagram of FIG. 15. The second external disturbance compensation signal $W_2$ which is the output signal of the estimation means 32 is a signal for cancelling the external disturbance and a method for deriving the signal $W_2$ is now explained.

As shown in a formula (3), a difference between a variable Y representing the position signal shown in the formula (1) and a variable $<y>$ representing the estimated position signal is calculated and it is stored as a variable $<<Y>>$ representing the estimated position error signal.

$$<<Y>> = Y - <Y> \tag{3}$$

As shown in a formula (4), a product of the digital estimated error signal $<<Y>>$ and a gain H is stored as the second external disturbance compensation signal $W_2$.

$$W_2 = H^* <<y>> \tag{4}$$

In preparation for the next sampling, an estimated position signal shown by a formula (5) is calculated and it is stored as a variable $<X_1>$.

$$<X_1> = <X_1> + T^*<X_2> + g_1^*U + l_1^*<<Y>> \tag{5}$$

An estimated velocity signal shown by a formula (6) is calculated and it is stored as a variable $<X_2>$.

$$<X_2> = <X_2> + g_2^*U + l_2^*<<Y>> \tag{6}$$

An estimated position signal shown by a formula (7) is calculated and it is stored as a variable $<Y>$.

$$<Y> = K_2^*<X_1> \tag{7}$$

The estimation means 32 repeats the above operation of the formulas (3) to (7) at an interval of T second.

Figure 15:
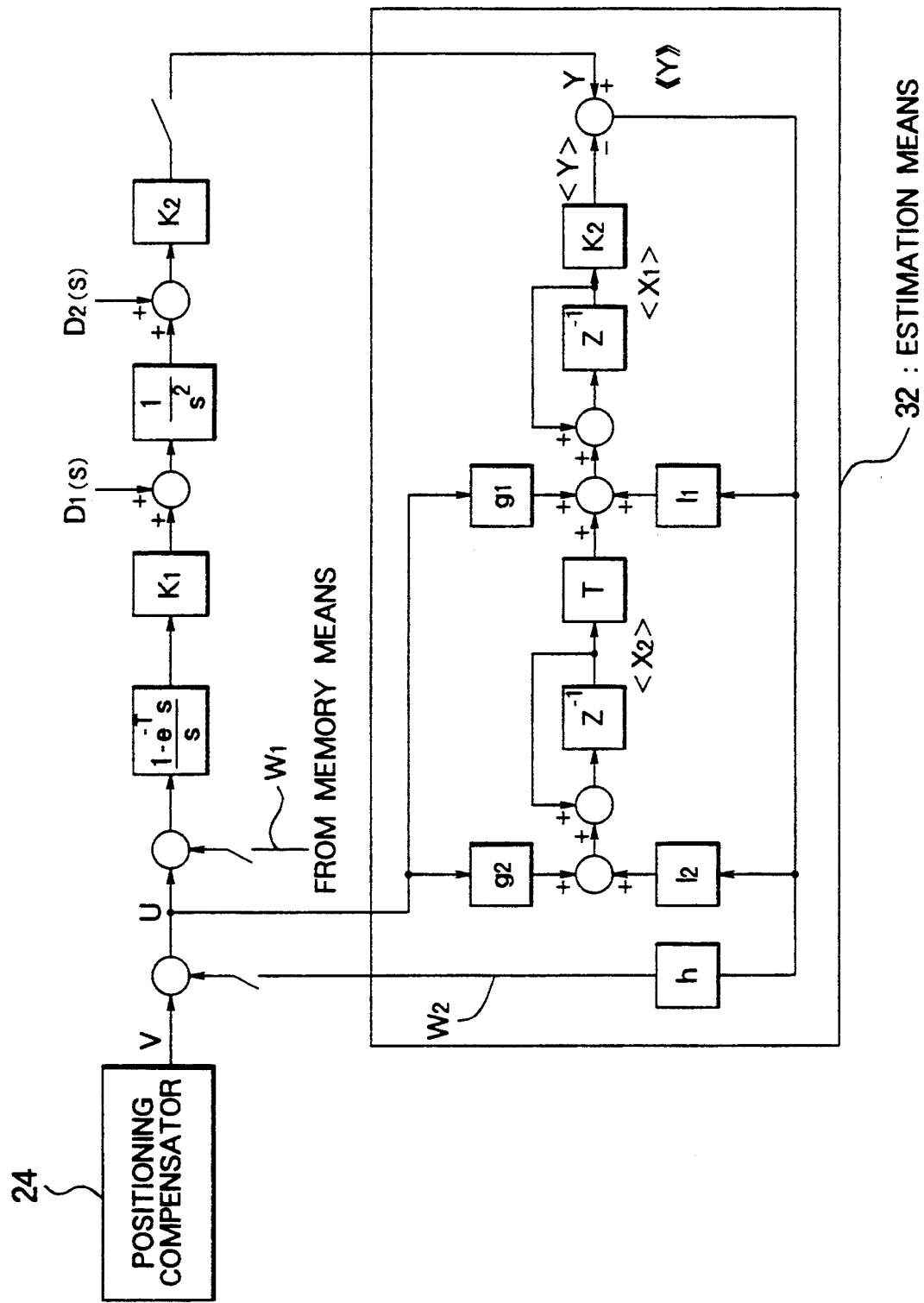
FIG. 15 shows a block diagram of estimation means 32 in a digital system embodiment.

In FIG. 15, gains $g_1$, $g_2$, $l_1$, $l_2$ and h are gains of the identity observer of the discrete time system prepared from a transfer function model from the signal U to the position signal Y, and they are defined as shown by formulas (8), (9), (10), (11) and (12).

$$g_1 = K_1^*T^2/2 \tag{8}$$
$$g_2 = K_1^*T \tag{9}$$

$$l_1 = 2\{1 - e^{-2\zeta\omega T}\cos(\omega T\sqrt{1-\zeta^2})\}/K_2 \tag{10}$$

$$l_2 = \{1 + e^{-2\zeta\omega T} - 2e^{-\zeta\omega T}\cos(\omega T\sqrt{1-\zeta^2})\}/TK_2 \tag{11}$$

$$h = -l_2/(K_1^*T) \tag{12}$$

Figure 16:
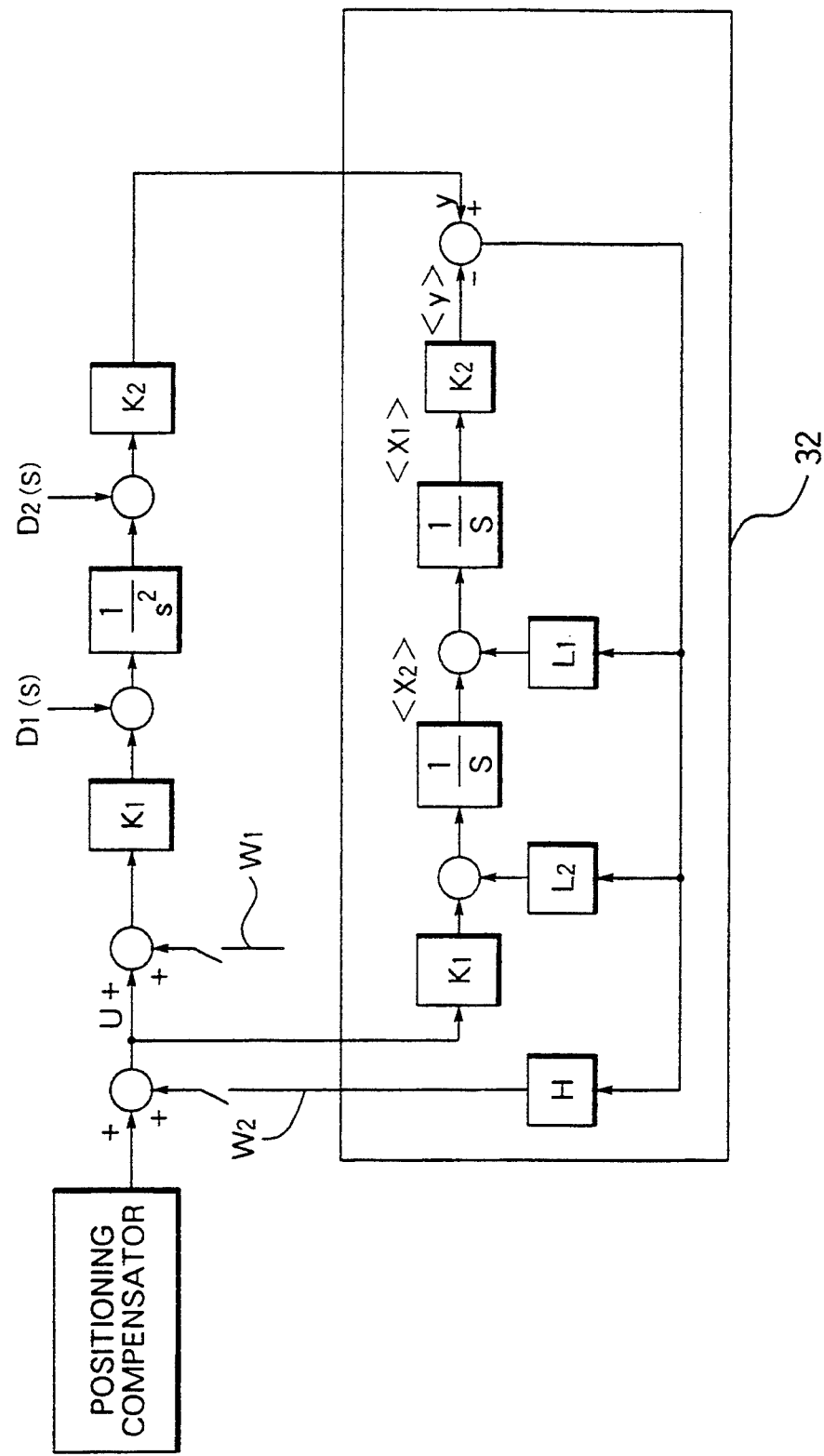
FIG. 16 shows a block diagram of the estimation means 32 in an analog system embodiment.

FIG. 15 shows a block diagram of the estimation means 32 realized in the digital control system. The estimation means in an ideal analog control system is shown in FIG. 16. In the analog control system of FIG. 16, $L_1$, $L_2$ and H are placed in formulas (13), (14) and (15) and a transfer characteristic to the second external disturbance compensation signal is represented by a formula (16). It is seen that it can cancel the external disturbance when $\omega$ is sufficiently large.

$$L_1 = 2\zeta\omega/K_2 \tag{13}$$
$$L_2 = \omega^2/K_2 \tag{14}$$
$$H = -L_2/K_1 \tag{15}$$

$$W_2(s) = -\frac{D_1(s) + s^2D_2(s)}{K_1} \cdot \frac{\omega^2}{s^2 + 2\zeta\omega s + \omega^2} \tag{16}$$

In FIG. 15, $g_1$, $g_2$, $l_1$ and $l_2$ are derived by making discrete the identity observer realized in the analog form in FIG. 16. In the digital control system, since the DC gain of the zero-order holder is T, the h of the digital control system is 1/T of the H designed for the analog.

The responses in the prior art control system and the control system of the present invention when the following control system is in operation are now compared.

Figure 17:
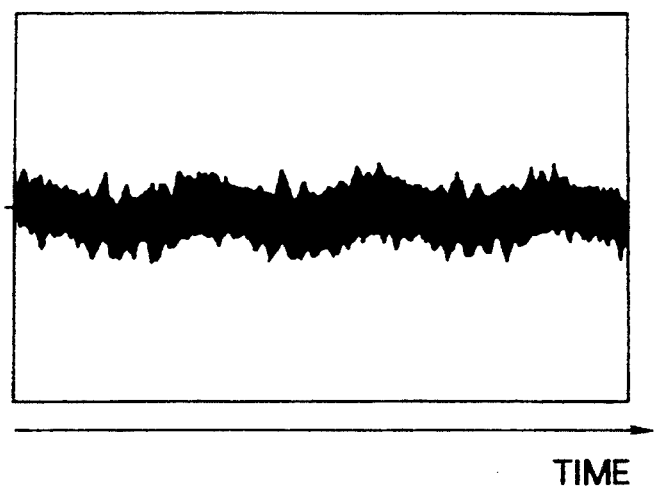
FIG. 17 shows a response waveform of a prior art head positioning control system.
Figure 18:
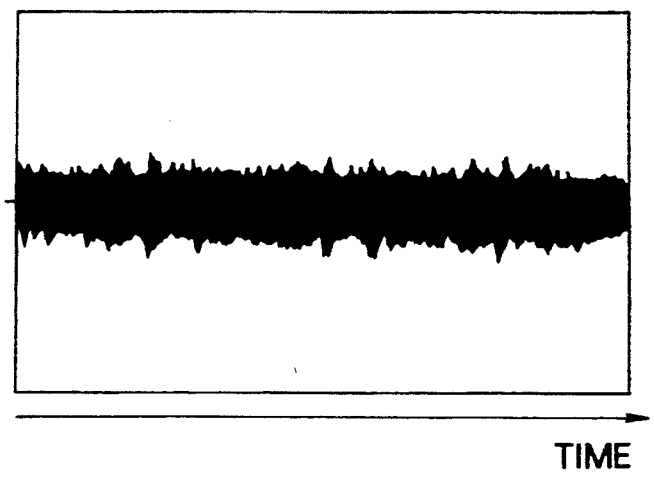
FIG. 18 shows a response waveform of the head positioning control system of the present invention.

The vibration occurred in the prior art following operation as shown in FIG. 17 is reduced as shown in FIG. 18 to improve the positioning precision.

<Sixth Embodiment>

Figure 19:
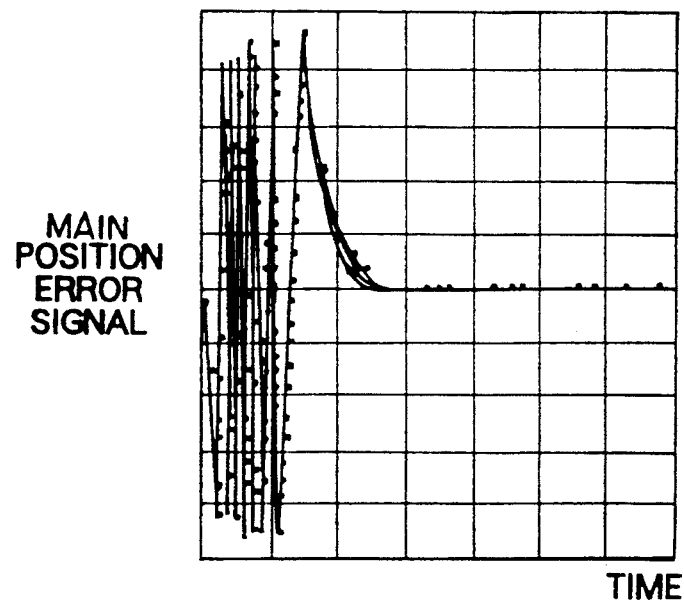
FIG. 19 shows a response waveform of a prior art head positioning control system.

Other embodiment of the present invention is now explained with reference to a block diagram of a control system of FIG. 14. In the positioning compensator having the velocity estimation means for combining the differentiated position signal passed through a low-pass filter and the integrated drive signal 18 passed through a high-pass filter to estimate the velocity signal, an error is included in the estimated velocity because the external disturbance is included in the position signal. Where the disk 4 is an eccentric disk and it is repeatedly sought and followed by a predetermined number of tracks by the prior art control system, a variation occurs in the response of the position error signal when the mode is switched from the seek mode to the following mode as shown in FIG. 19. Since the differentiation of the position signal, that is, a relative velocity signal between the head and the disk and the integration of the VCM power supply, that is, the head absolute velocity signal divided into frequency bands are used, an error is included in the estimated velocity when the disk is eccentric, and a variation occurs as shown in FIG. 19.

Figure 20:
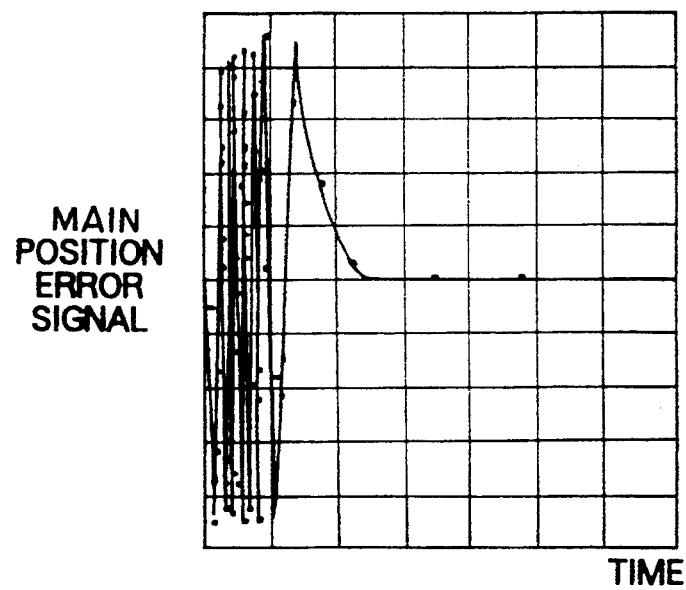
FIG. 20 shows a response waveform of the head positioning control system of the present invention.

The effect of the external disturbance can be reduced by applying the first external disturbance compensation signal generated in the same manner as that of the embodiment shown in FIG. 11 to the third correction means 40. A difference between the drive signal 18 and a signal proportional to the first external disturbance compensation signal is integrated so that the integration term of the velocity estimation means can reproduce the disk-head relative velocity signal. The seek control and the following control are effected while the correction by the third correction means 40 and the correction by the first correction means are made. Thus, the velocity estimation means can reduce the variation in the response of the positioning control system even if the external disturbance is present. A waveform of response when the seek mode and the follow mode are repeated is shown in FIG. 20. It is seen that the variation in the response is eliminated by the present invention in spite of the external disturbance acting due to the eccentricity of the disk.

The estimation means 32 and the second correction means 34 may be activated during the seek control and the following control to cancel the external disturbance which is not synchronous with the rotation such as vibration.

In accordance with the present invention, the effect of the external disturbance can be cancelled even if the external disturbance or the vibration acts on the positioning control system and the positioning precision is improved and the access time can be shorted.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A disk storage device having a head positioning servo mechanism comprising:
   at least one disk to be rotatably driven;
   a head for reading a servo signal recorded on said at least one disk for representing a radial position and a circumferential position of said at least one disk;
   a position detector for generating a position signal representing a position of said head from said servo signal;
   an actuator having said head secured thereto;
   a drive circuit for producing a drive signal in accordance with an input signal to drive said actuator;
   a controller for outputting a move command in accordance with an externally applied control signal;
   a positioning compensator for calculating a positioning compensation signal such that the position signal coincides with a target position in accordance with the move command from said controller and outputting the positioning compensation signal to said drive circuit;
   estimation means for estimating an external disturbance compensation signal for cancelling as a function of the drive signal and the position signal;
   memory means for storing the external disturbance compensation signal; and
   first correction means for adding to an input signal to said drive circuit the external disturbance compensation signal stored in the memory means as a feedforward signal for correction.

2. A disk storage device according to claim 1 wherein said estimation means calculates, immediately after the power-on and at every predetermined time interval after the power-on, a synchronous external disturbance compensation signal for suppressing the external disturbance acting in one circumferential direction during a plurality of revolutions of said at least one disk when said head is positioned to one representative or a plurality of representative or all of the tracks of said at least one disk as target tracks, determine the synchronous external compensation signal on tracks other than the target tracks by interpolating data of the synchronous external disturbance compensation signals of the representative tracks, and stores the synchronous external disturbance signal in said memory means as a function of the position on said at least one disk, and
   said first correction means outputs the synchronous external compensation signal in accordance with the position on said at least one disk as the feedforward signal.

3. A disk storage device according to claim 1 wherein said estimation means calculates, immediately after the power-on and at each predetermined time interval after the power-on, a DC external disturbance compensation signal for suppressing the DC external disturbance acting on the target tracks during a plurality of revolutions of said at least one disk when said head is positioned to one representative or a plurality of representative or all of the tracks of said at least one disk as target tracks during a plurality of revolutions of said at least one disk, determines the DC external disturbance compensation signals on tracks other than the target tracks by interpolating the data of the DC external disturbance compensation signals of the representative tracks, and stores the DC external disturbance compensation signals in said memory means as a function of the position on said at least one disk, and
   said first correction means outputs the DC external disturbance compensation signal in accordance with the position on said disk as the feedforward signal.

4. A disk storage device according to claim 1 wherein said estimation means calculates, immediately after the power-on and at each predetermined time interval after the power-on, a AC external disturbance compensation signal for suppressing the AC external disturbance acting on the target tracks during a plurality of revolutions of said at least one disk when said head is positioned to one representative or a plurality of representative or all of the tracks of said at least one disk as the representative tracks, determines the AC external disturbance compensation signals on tracks other than the target tracks by interpolating the data of the AC external disturbance compensation signals of the representative tracks, and stores the AC external disturbance compensation signals in said memory means as a function of the position on said at least one disk, and
   said first correction means outputs the AC external disturbance compensation signal in accordance with the position on said at least one disk as the feedforward signal.

5. A disk storage device according to claim 1 wherein said estimation means calculates, immediately after the power-on and at each predetermined time interval after the power-on, a AC external disturbance compensation signal for suppressing the AC external disturbance acting the target tracks during a plurality of revolutions of said at least one disk when said head is positioned to one representative or a plurality of representative or all of the tracks of said at least one disk as the target tracks, determines the AC external disturbance compensation signals of tracks other than the target tracks by interpolating the data of the AC external disturbance compensation signals of the representative tracks, stores the AC external disturbance compensation signals in said memory means as a function of the position on said at least one disk, and > after said head is positioned to one new representative or a plurality of new representative or all of said tracks, said estimation means calculates a DC external disturbance compensation means for suppressing the DC external disturbance acting on the new target tracks during a plurality of revolutions of said at least one disk, determines the DC external disturbance compensation signals on the tracks other than the new target tracks by interpolating the DC external disturbance compensation signals of the new representative tracks, and stores the DC external disturbance compensation signals in said memory means as the function of the position on said disk, and,
>
> said first correction means outputs a sum signal of the AC external disturbance compensation signal and the DC external compensation signal in accordance with the position on said at least one disk as the feedforward signal.

6. A disk storage device according to claim 2, further comprising second correction means, provided between the output of said drive circuit and the output of said estimation circuit, and the input of said positioning compensator, for determining a signal equal to a difference between the drive signal and a signal proportional to the external disturbance compensation signal, and outputting the difference signal to said velocity signal estimation means instead of the drive signal, and wherein > said positioning compensator includes velocity signal estimation means for estimating a velocity signal of said head as a function of the drive signal and the position signal.

7. A disk storage device according to claim 3 further comprising second correction means, provided between the output of said drive circuit and the output of said estimation circuit, and the input of said positioning compensator, for determining a signal equal to a difference between the drive signal and a signal proportional to the external disturbance compensation signal, and outputting the difference signal to said velocity signal estimation means instead of the drive signal, and wherein > said positioning compensator includes velocity signal estimation means for estimating a velocity signal of said head as a function of the drive signal and the position signal.

8. A disk storage device according to claim 4 further comprising second correction means, provided between the output of said drive circuit and the output of said estimation circuit, and the input of said positioning compensator, for determining a signal equal to a difference between the drive signal and a signal proportional to the external disturbance compensation signal, and outputting the difference signal to said velocity signal estimation means instead of the drive signal, and wherein > said positioning compensator includes velocity signal estimation means for estimating a velocity signal of said head as a function of the drive signal and the position signal.

9. A disk storage device according to claim 5 further comprising second correction means, provided between the output of said drive circuit and the output of said estimation circuit, and the input of said positioning compensator, for determining a signal equal to a difference between the drive signal and a signal proportional to the external disturbance compensation signal, and outputting the difference signal to said velocity signal estimation means instead of the drive signal, and wherein > said positioning compensator includes velocity signal estimation means for estimating a velocity signal of said head as a function of the drive signal and the position signal.

10. A disk storage device comprising:

a head for reading a servo signal recorded on a disk for representing a radial position and a circumferential position of said disk;

a position detector for generating a position signal representing the position of said head based on the servo signal;

a drive circuit for outputting a drive signal for driving an actuator having said head secured thereto in accordance with an input signal;

a positioning compensator for calculating a positioning compensation signal to cause the position signal to coincide with a target position and outputting the positioning compensation signal to said drive circuit;

first correction means for adding a first external disturbance compensation signal for cancelling periodic external disturbance applied to a positioning control system of said head to an input signal to said drive circuit for correction;

memory means for storing the first external disturbance compensation signal and outputting the same in accordance with the position signal;

second correction means for adding a second external disturbance compensation signal for cancelling the external disturbance remaining after the cancellation by the first external disturbance compensation signal to the positioning compensation signal for correction;

estimation means for estimating the second external disturbance compensation signal as a function of the output of the second correction means and the position signal; and an external disturbance compensation signal modifier for generating a sum signal of the first external disturbance compensation signal and the second external disturbance compensation signal and storing the sum signal in said memory means as a new first external disturbance compensation signal.

11. A disk storage device according to claim 10 wherein said positioning compensator includes velocity signal estimation means for estimating a velocity signal as a function of the drive signal and the position signal, > further comprising third correction means for subtracting a signal proportional to the first external disturbance compensation signal from the drive signal, and
>
> the subtracted signal being applied to said velocity estimation means instead of the drive signal.

12. A disk storage device comprising:

a plurality of disks to be rotatably driven;

a head for reading a servo signal recorded on said disk to represent a radial position and a circumferential position on said disk;

a position detector for generating a position signal representing the position of said head based on the servo signal;

an actuator having said head secured thereto;

a drive circuit for outputting a drive signal for driving said actuator in accordance with an input signal;

a head positioning servo mechanism including a positioning compensator for calculating a positioning compensation signal such that the position signal coincides to a target position and outputting the same to said drive circuit;

a controller for controlling said servo mechanism;

first correction means for adding a first external disturbance compensation signal for cancelling periodic external disturbance applied to said head positioning control system for correction;

memory means for storing the first external disturbance compensation signal and outputting the same in accordance with the position signal;

second correction means for adding a second external disturbance compensation signal for cancelling the external disturbance remaining after the cancellation by the first external disturbance compensation signal to the positioning compensation signal for correction;

estimation means for estimating the second external disturbance compensation signal as a function of the output of said second correction means and the position signal and;

an external disturbance compensation signal modifier for generating a sum of the first external disturbance compensation signal and the second external disturbance compensation signal and storing the same in said memory means as a new first external disturbance compensation signal;

said external disturbance compensation signal modifier updating the first external disturbance compensation signal stored in said memory means when said head is positioned to a predetermined track; and said first correction means correcting by using the updated first external disturbance compensation signal.

13. A disk storage device comprising:

a plurality of disks to be rotatably driven;

a head for reading a servo signal recorded on said disk to represent a radial position and a circumferential position on said disk;

a position detector for generating a position signal representing the position of said head based on the servo signal;

an actuator having said head secured thereto;

a drive circuit for outputting a drive signal for driving said actuator in accordance with an input signal;

a head positioning servo mechanism including a positioning compensator for calculating a positioning compensation signal such that the position signal coincides to a target position and outputting the same to said drive circuit;

a controller for controlling said servo mechanism;

first correction means for adding a first external disturbance compensation signal for cancelling periodic external disturbance applied to said head positioning control system for correction;

memory means for storing the first external disturbance compensation signal and outputting the same in accordance with the position signal;

second correction means for adding a second external disturbance compensation signal for cancelling the external disturbance remaining after the cancellation by the first external disturbance compensation signal to the positioning compensation signal for correction;

estimation means for estimating the second external disturbance compensation signal as a function of the output of said second correction means and the position signal;

an external disturbance compensation signal modifier for generating a sum of the first external disturbance compensation signal and the second external disturbance compensation signal and storing the same in said memory means as a new first external disturbance compensation signal;

said external disturbance compensation signal modifier updating the first external disturbance compensation signal stored in said memory means when said head is positioned to a predetermined track;

said first correction means correcting by using the updated first external disturbance compensation signal and said second correction means correcting by using the second external disturbance compensation signal.

14. A disk storage device comprising:

a plurality of disks to be rotatably driven;

a head for reading a servo signal recorded on said disk to represent a radial position and a circumferential position on said disk;

a position detector for generating a position signal representing the position of said head based on the servo signal;

an actuator having said head secured thereto;

a drive circuit for outputting a drive signal for driving said actuator in accordance with an input signal;

a head positioning servo mechanism including velocity signal estimation means for estimating a velocity signal of said head as a function of the drive signal and the position signal and a positioning compensator for calculating a positioning compensation signal such that the position signal coincides to a target position and outputting the same to said drive circuit;

a controller for controlling said servo mechanism;

first correction means for adding a first external disturbance compensation signal for cancelling periodic external disturbance applied to said head positioning control system for correction;

memory means for storing the first external disturbance compensation signal and outputting the same in accordance with the position signal;

second correction means for adding a second external disturbance compensation signal for cancelling the external disturbance remaining after the cancellation by the first external disturbance compensation signal to the positioning compensation signal for correction;

estimation means for estimating the second external disturbance compensation signal as a function of the output of said second correction means and the position signal;

an external disturbance compensation signal modifier for generating a sum of the first external disturbance compensation signal and the second external disturbance compensation signal and storing the same in said memory means as a new first external disturbance compensation signal; and third correction means for subtracting the new first external disturbance compensation signal form the drive signal for correction;

said external disturbance compensation signal modifier updating the first external disturbance compensation signal stored in said memory means when said head is positioned to a predetermined track;

said first correction means correcting by using the updated first external disturbance compensation signal and the output signal of said third correction means being applied to said velocity signal estimation means instead of the drive signal.

15. A disk storage device comprising:

a plurality of disks to be rotatably driven;

a head for reading a servo signal recorded on said disk to represent a radial position and a circumferential position on said disk;

a position detector for generating a position signal representing the position of said head based on the servo signal;

an actuator having said head secured thereto;

a drive circuit for outputting a drive signal for driving said actuator in accordance with an input signal;

a head positioning servo mechanism including velocity signal estimation means for estimating a velocity signal of said head as a function of the drive signal and the position signal and a positioning compensator for calculating a positioning compensation signal such that the position signal coincides to a target position and outputting the same to said drive circuit;

a controller for controlling said servo mechanism;

first correction means for adding a first external disturbance compensation signal for cancelling periodic external disturbance applied to said head positioning control system for correction;

memory means for storing the first external disturbance compensation signal and outputting the same in accordance with the position signal;

second correction means for adding a second external disturbance compensation signal for cancelling the external disturbance remaining after the cancellation by the first external disturbance compensation signal to the positioning compensation signal for correction;

estimation means for estimating the second external disturbance compensation signal as a function of the output of said second correction means and the position signal;

an external disturbance compensation signal modifier for generating a sum of the first external disturbance compensation signal and the second external disturbance compensation signal and storing the same in said memory means as a new first external disturbance compensation signal; and third correction means for subtracting the new first external disturbance compensation signal form the drive signal for correction;

said external disturbance compensation signal modifier updating the first external disturbance compensation signal stored in said memory means when said head is positioned to a predetermined track;

said first correction means correcting by using the updated first external disturbance compensation signal and said second correction means correcting by using the second external disturbance compensation signal, and the output signal of said third correction means being applied to said velocity signal estimation means instead of the drive signal.

16. A disk storage device according to claim 12 wherein said external disturbance compensation signal modifier updates the first external disturbance compensation signal a plurality of times.

17. A disk storage device according to claim 13 wherein said external disturbance compensation signal modifier updates the first external disturbance compensation signal a plurality of times.

18. A disk storage device according to claim 14 wherein said external disturbance compensation signal modifier updates the first external disturbance compensation signal a plurality of times.

19. A disk storage device according to claim 15 wherein said external disturbance compensation signal modifier updates the first external disturbance compensation signal a plurality of times.

20. A disk storage device according to claim 2, further comprising second correction means for subtracting a signal proportional to the synchronous external disturbance compensation signal from the drive signal, wherein said positioning compensator includes velocity signal estimation means for estimating a velocity signal as a function of the drive signal and the position signal, and wherein said subtracted signal is applied to said velocity estimation means instead of the drive signal.

21. A disk storage device according to claim 3, further comprising second correction means for subtracting a signal proportional to the DC external disturbance compensation signal from the drive signal, wherein said positioning compensator includes velocity signal estimation means for estimating a velocity signal as a function of the drive signal and the position signal, and wherein said subtracted signal is applied to said velocity estimation means instead of the drive signal.

22. A disk storage device according to claim 4, further comprising second correction means for subtracting a signal proportional to the AC external disturbance compensation signal from the drive signal, wherein said positioning compensator includes velocity signal estimation means for estimating a velocity signal as a function of the drive signal and the position signal, and wherein said subtracted signal is applied to said velocity estimation means instead of the drive signal.

23. A disk storage device according to claim 5, further comprising second correction means for subtracting a signal proportional to the sum signal of the AC external disturbance compensation signal and the DC external disturbance compensation signal from the drive signal, wherein said positioning compensator includes velocity signal estimation means for estimating a velocity signal as a function of the drive signal and the position signal, and wherein said subtracted signal is applied to said velocity estimation means instead of the drive signal.

* * * * *